United States Patent
Yuhara et al.

(10) Patent No.: US 9,425,478 B2
(45) Date of Patent: Aug. 23, 2016

(54) STACKING APPARATUS AND STACKING METHOD

(75) Inventors: Hiroshi Yuhara, Yokohama (JP); Takahiro Yanagi, Kawasaki (JP); Manabu Yamashita, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 166 days.

(21) Appl. No.: 14/009,626

(22) PCT Filed: Apr. 6, 2012

(86) PCT No.: PCT/JP2012/059487
§ 371 (c)(1),
(2), (4) Date: Oct. 3, 2013

(87) PCT Pub. No.: WO2012/137912
PCT Pub. Date: Oct. 11, 2012

(65) Prior Publication Data
US 2014/0020239 A1      Jan. 23, 2014

(30) Foreign Application Priority Data

Apr. 7, 2011   (JP) .................................. 2011-085733

(51) Int. Cl.
*H01M 2/14*     (2006.01)
*H01M 2/16*     (2006.01)
(Continued)

(52) U.S. Cl.
CPC ........... *H01M 10/0404* (2013.01); *B29C 65/18* (2013.01); *B29C 65/7847* (2013.01);
(Continued)

(58) Field of Classification Search
CPC .................... H01M 10/0404; H01M 10/0413; H01M 10/0525; H01M 10/0585; H01M 2/14; H01M 2/145; H01M 2/18; H01M 2220/20
See application file for complete search history.

(56) References Cited

U.S. PATENT DOCUMENTS 4,026,000 A    5/1977   Anderson
4,314,403 A    2/1982   Sanekata
(Continued)

FOREIGN PATENT DOCUMENTS

CN    103250276 A    8/2013
DE    32 07 070 A1   9/1983
(Continued)

OTHER PUBLICATIONS

Machine Translation of: JP 2005/026194 A, Minoura et al., Jan. 27, 2005.*
(Continued)

*Primary Examiner* — Kenneth Douyette
(74) *Attorney, Agent, or Firm* — Foley & Lardner LLP

(57) ABSTRACT

The stacking apparatus of the present invention includes a separator conveyance unit to convey a separator of predetermined shape in a held state, an electrode conveyance unit to convey a positive electrode of predetermined shape, and a control unit to synchronize the conveying position and conveyance speed of the separator conveyance unit with those of the electrode conveyance unit so that the separator and positive electrode overlap each other at a predetermined position. The stacking apparatus conveys the separator and positive electrode and transfers the separator onto the electrode from a downstream side of the conveying direction while gradually removing the separator from the separator conveyance unit, thereby stacking the separator on the electrode.

5 Claims, 21 Drawing Sheets

(51) Int. Cl.
  *H01M 10/04* (2006.01)
  *H01M 10/0525* (2010.01)
  *H01M 10/0585* (2010.01)
  *B29C 65/18* (2006.01)
  *B29C 65/78* (2006.01)
  *B29C 65/00* (2006.01)
  *B29C 65/80* (2006.01)
  *B29L 31/34* (2006.01)
  *B29C 65/48* (2006.01)
  *B29C 65/56* (2006.01)

(52) U.S. Cl.
  CPC ............. *B29C65/80* (2013.01); *B29C 66/1122* (2013.01); *B29C 66/21* (2013.01); *B29C 66/433* (2013.01); *B29C 66/81429* (2013.01); *B29C 66/83543* (2013.01); *H01M 2/14* (2013.01); *H01M 10/0413* (2013.01); *H01M 10/0525* (2013.01); *H01M 10/0585* (2013.01); *B29C 65/48* (2013.01); *B29C 65/56* (2013.01); *B29L 2031/3468* (2013.01); *Y02E 60/122* (2013.01); *Y10T 29/49108* (2015.01); *Y10T 29/53135* (2015.01)

(56) References Cited

U.S. PATENT DOCUMENTS

| | | | |
|---|---|---|---|
| 5,323,527 A * | 6/1994 | Ribordy et al. | 29/623.1 |
| 6,805,720 B1 | 10/2004 | Yajima et al. | |
| 7,258,948 B2 | 8/2007 | Miyamoto et al. | |
| 8,322,594 B2 | 12/2012 | Yano et al. | |
| 8,844,795 B2 | 9/2014 | Yano et al. | |
| 2005/0061426 A1* | 3/2005 | Parker | B32B 37/003 156/264 |
| 2012/0132697 A1 | 5/2012 | Yano et al. | |
| 2012/0175406 A1 | 7/2012 | Yano et al. | |

FOREIGN PATENT DOCUMENTS

| | | |
|---|---|---|
| EP | 1 265 306 A1 | 12/2002 |
| EP | 2 458 669 A2 | 5/2012 |
| GB | 1 565 928 A | 4/1980 |
| JP | 60-165050 A | 8/1985 |
| JP | 10-275628 A | 10/1998 |
| JP | 2001-76743 A | 3/2001 |
| JP | 2002-100394 A | 4/2002 |
| JP | 2005-026194 A | 1/2005 |
| JP | 2006-331796 A | 12/2006 |
| JP | 2007-242506 A | 9/2007 |
| JP | 2007-329111 A | 12/2007 |
| JP | 2012-113994 A | 6/2012 |
| TW | 488102 B | 5/2002 |
| TW | 494598 | 7/2002 |
| TW | I233709 | 6/2005 |
| TW | 201027828 A | 7/2010 |

OTHER PUBLICATIONS

Supplementary European Search Report dated Sep. 11, 2014, 8 pgs.
Japanese Office Action and English language translation dated Dec. 2, 2014, 5 pgs.
Taiwanese Office Action dated Mar. 17, 2014 (3 pages).

* cited by examiner

FIG. 3
(A)
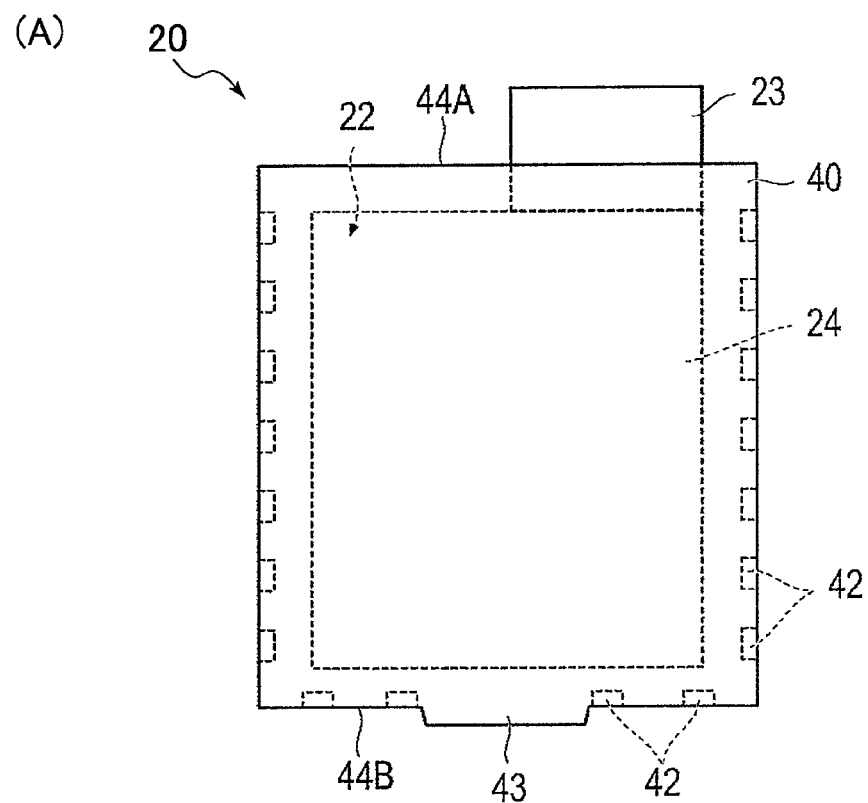
(B)
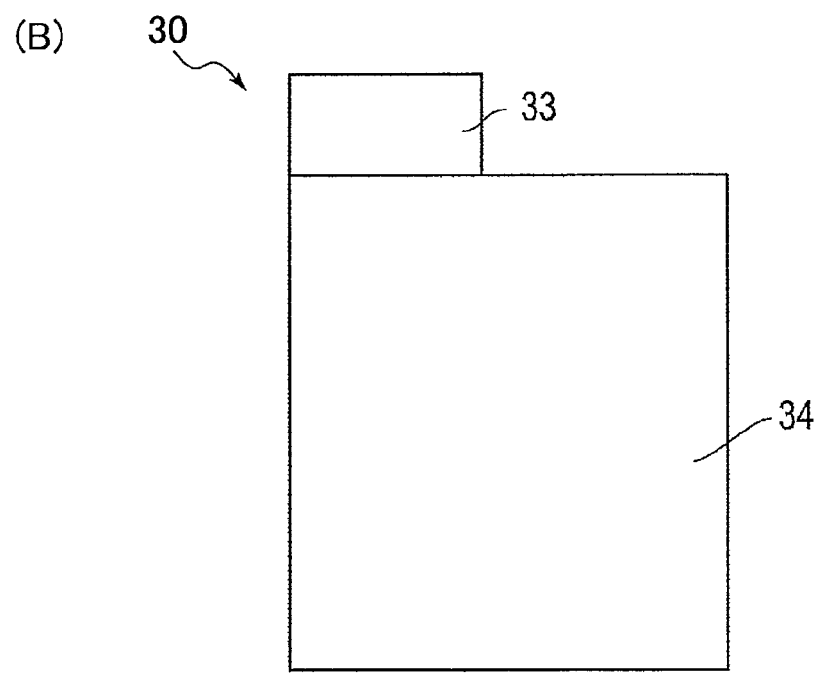

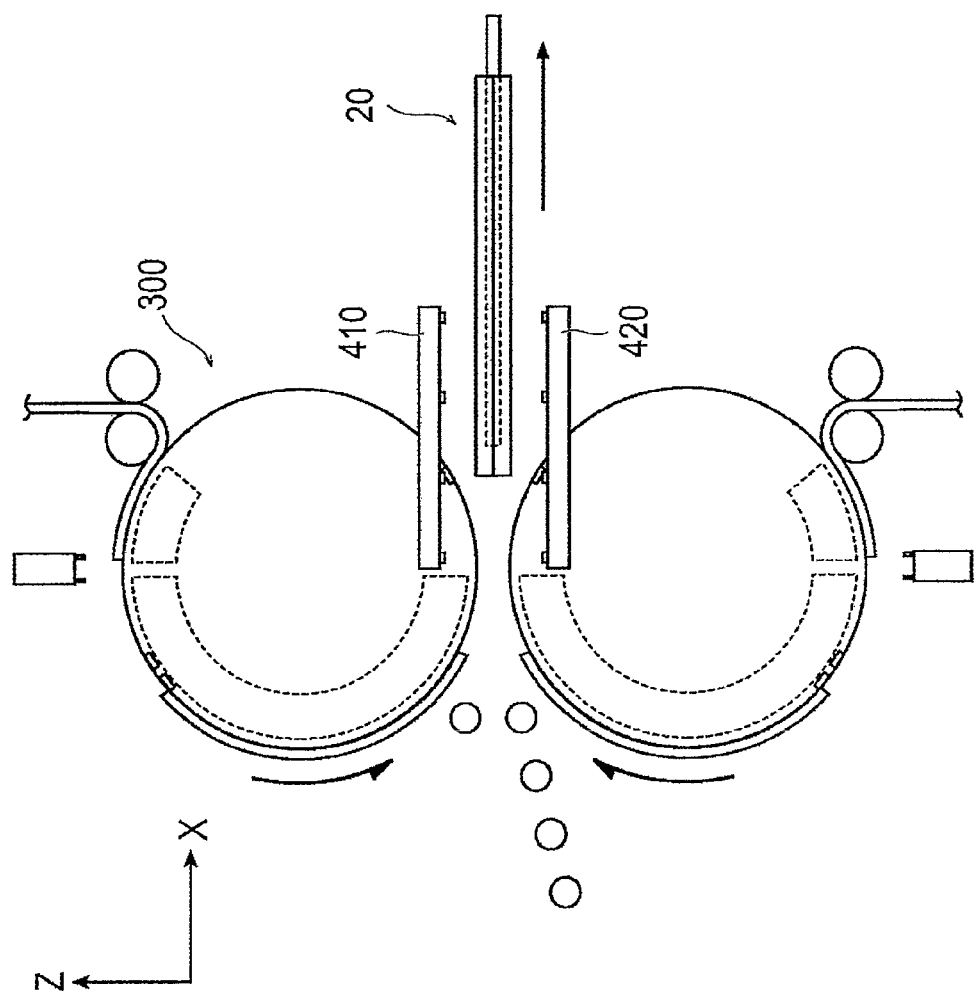
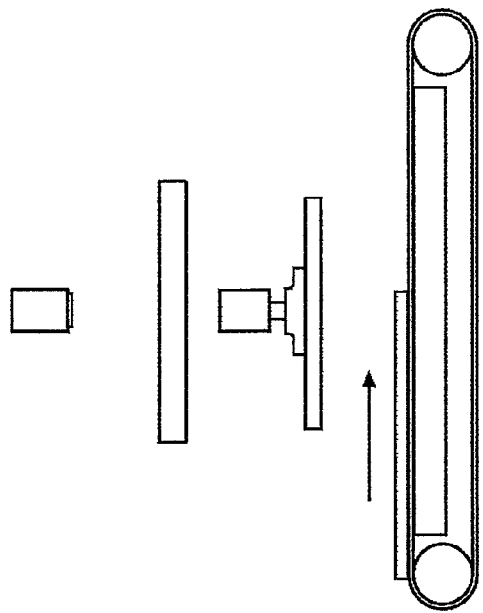
FIG. 18

STACKING APPARATUS AND STACKING METHOD

TECHNICAL FIELD

The present invention relates to a stacking apparatus and a stacking method.

BACKGROUND ART

Recent years, various kinds of batteries such as car batteries, solar batteries, and electronic-equipment batteries employ stacked cells. The stacked cell is formed by shaping a positive electrode, a negative electrode (hereinafter, the positive or negative electrode is sometimes referred to as an electrode), and a separator into sheets and by stacking them in order of the positive electrode, separator, negative electrode, and separator.

For manufacturing such stacked cells, various apparatuses have been proposed, for example, Japanese Unexamined Patent Application Publication No. 2007-329111 (Patent Literature 1).

The apparatus described in the Patent Literature 1 arranges a bearer and a presser plate so that they vertically face each other. In a state that the bearer and presser plate are stopped moving in a conveying direction, each of the bearer and presser plate draws and holds a separator. On the separator drawn to the lower bearer, a positive electrode is placed. Thereafter, the upper presser plate is lowered to put the separator drawn to the presser plate onto the positive electrode. In this state, edges of the separators that overlap each other around the positive electrode are thermally bonded to each other, thereby forming a packaged positive electrode in which the positive electrode is held between the separators bonded like a bag. The bearer, presser plate, and packaged positive electrode held between them are conveyed. The packaged positive electrode is taken out from between the bearer and the presser plate. The packaged positive electrode and a negative electrode are stacked on each other to form a cell element in which the positive electrode, separator, negative electrode, and separator are stacked in this order.

SUMMARY OF INVENTION

Problems to be Solved by Invention

The apparatus described in the Patent Literature 1, however, draws a separator by each of the bearer and presser plate that are stopped, holds a positive electrode between the separators by bringing the bearer and presser plate closer to each other, forms a packaged positive electrode, and conveys the packaged positive electrode by moving the bearer and presser plate that have been stopped. This technique elongates a manufacturing time.

The present invention has been made to solve the above-mentioned problem. The present invention is able to provide a stacking apparatus and stacking method capable of stacking separators and electrodes one on another at high speed, thereby shortening a manufacturing time of batteries.

Means to Solve Problems

A stacking apparatus according to the present invention includes a separator conveyance unit to convey a separator of predetermined shape in a held state and an electrode conveyance unit to convey an electrode of predetermined shape. The stacking apparatus conveys the separator and electrode so that they overlap each other at a predetermined position and transfers the separator onto the electrode from a downstream side of the conveying direction while gradually removing the separator from the separator conveyance unit, thereby stacking the separator on the electrode.

A stacking method according to the present invention conveys by a separator conveyance unit a separator of predetermined shape in a held state and conveys by an electrode conveyance unit an electrode so that the separator and electrode overlap each other at a predetermined position. The stacking method conveys the electrode and separator and transfers the separator onto the electrode from a downstream side of a conveying direction so that the separator gradually leaves the separator conveyance unit and is stacked on the electrode.

BRIEF DESCRIPTION OF DRAWINGS

FIG. 3 is a plan view illustrating a negative electrode and packaged positive electrode.

FIG. 18 is an eighth explanatory view illustrating a process of the stacking method carried out by the stacking apparatus.

MODE OF IMPLEMENTING INVENTION

Figure 1:
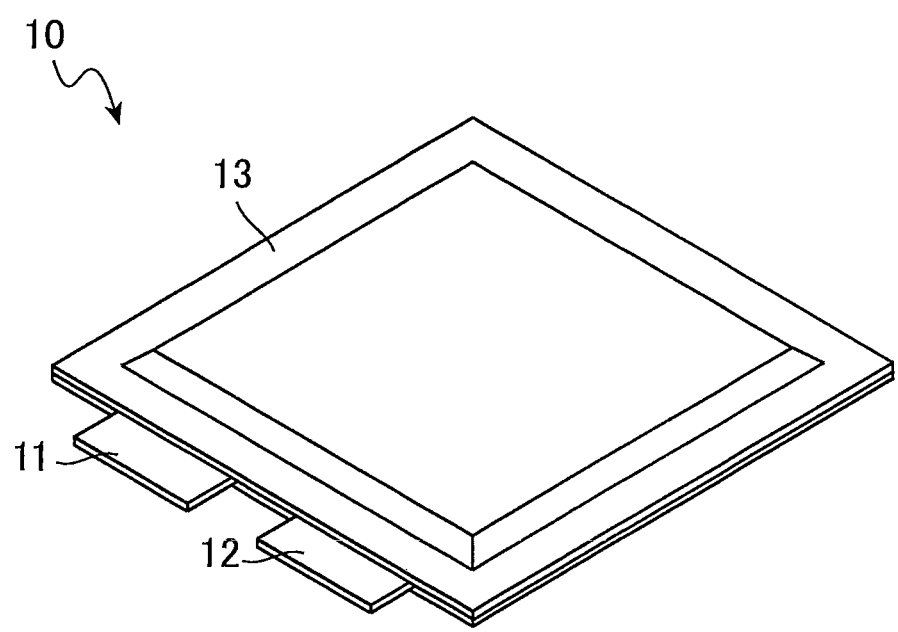
FIG. 1 is a perspective view illustrating an exterior of a lithium ion secondary cell.

Embodiments of the present invention will be explained with reference to the accompanying drawings. Dimensional ratios in the drawings are exaggerated for the sake of explanation and differ from actual ones.

The present invention relates to a stacking apparatus and stacking method for assembling power generation elements of a cell, the apparatus and method being applied to part of a battery manufacturing process. Before explaining a stacking apparatus according to an embodiment of the present invention, the structure of a cell will be explained.

Cell

Figure 2:
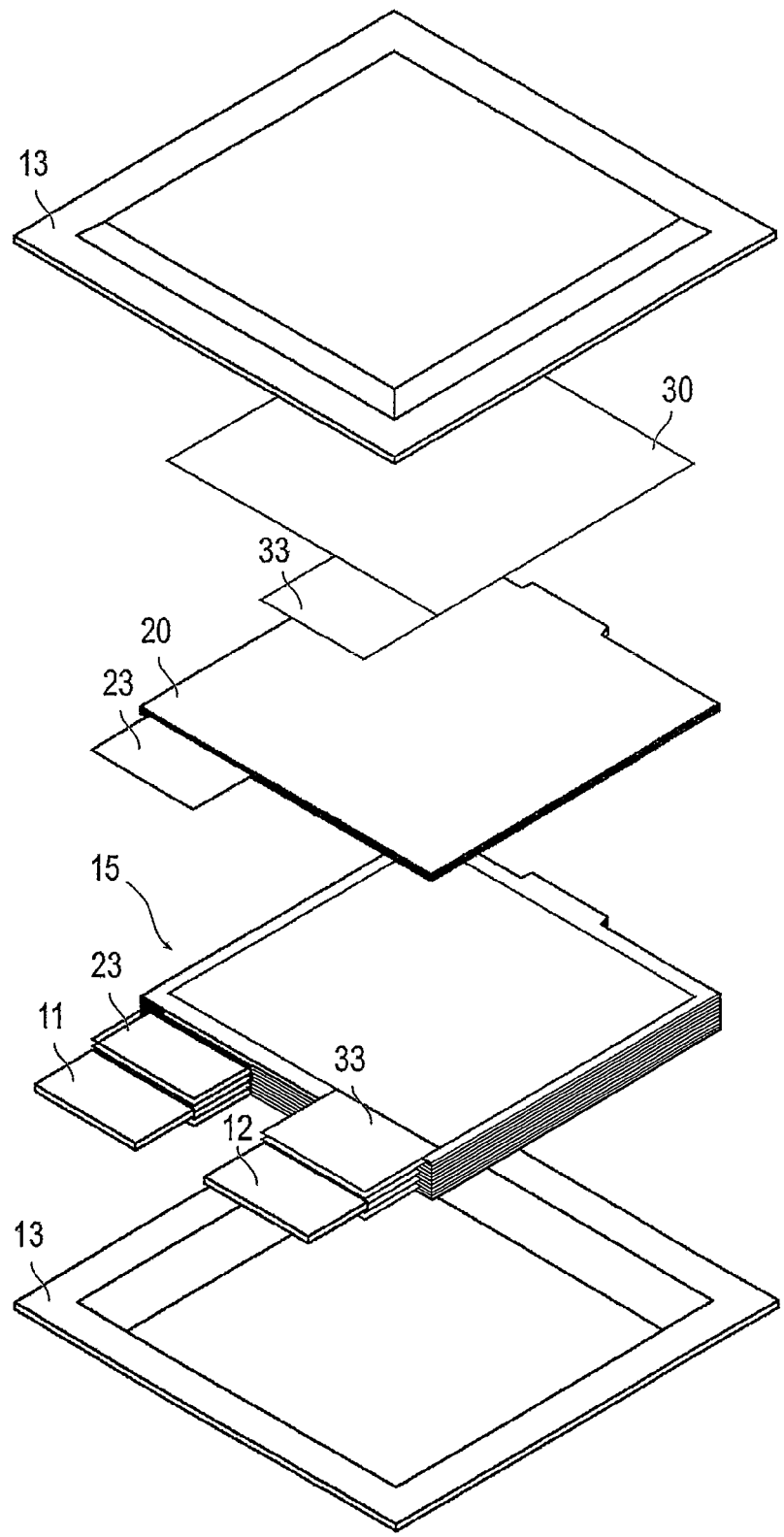
FIG. 2 is an exploded perspective view of the lithium ion secondary cell.

With reference to FIG. 1, a lithium ion secondary cell (stacked cell) formed by the stacking apparatus will be explained. FIG. 1 is a perspective view illustrating an exterior of the lithium ion secondary cell, FIG. 2 is an exploded perspective view of the lithium ion secondary cell, and FIG. 3 is a plan view illustrating a negative electrode and a packaged positive electrode.

As illustrated in FIG. 1, the lithium ion secondary cell 10 has a flat rectangular shape. A positive lead 11 and a negative lead 12 are led out of the same end of a jacket 13. The jacket 13 incorporates a power generation element (cell element) 15 in which a charge-discharge reaction progresses. As illustrated in FIG. 2, the power generation element 15 is formed by alternately stacking packaged positive electrodes 20 and negative electrodes 30.

As illustrated in FIG. 3(A), the packaged positive electrode 20 is formed by holding a rectangular positive electrode 22 between rectangular separators 40. The positive electrode 22 includes a very thin sheet-like positive collector (collector foil) that has, on each surface thereof, a positive active material layer. The two separators 40 are joined to each other at joints 42 along edges thereof, to form a bag. The separator 40 has a linear side 44A from which a positive tab 23 of the positive electrode 22 is led out. Partly protruding from a side 44B opposite to the side 44A is a fitting part 43. The fitting part 43 fits to the inside of the jacket 13, to fix the cell element 15 to the jacket 13. The positive electrode 22 has the positive active material layer 24 except for the positive tab 23.

As illustrated in FIG. 3(B), the negative electrode 30 has a rectangular shape and includes a very thin sheet-like negative collector (collector foil) that has, on each surface thereof, a negative active material layer 34. The negative electrode 30 has the negative active material layer 34 except for a negative tab 33.

Figure 4:
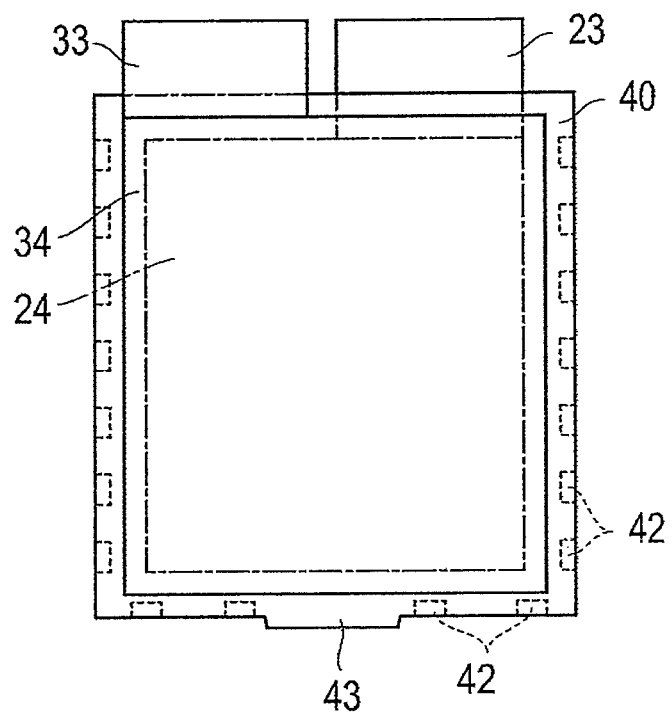
FIG. 4 is a plan view illustrating the packaged positive electrode and negative electrode stacked one on another.

The negative electrode 30 is stacked on the packaged positive electrode 20 as illustrated in FIG. 4. In FIG. 4, the negative active material layer 34 is a size larger than the positive active material layer 24 of the positive electrode 22 in a plan view.

A general method of manufacturing a lithium ion secondary cell by alternately stacking the packaged positive electrodes 20 and negative electrodes 30 is well-known, and therefore, will not be explained in detail.

Stacking Apparatus

A stacking apparatus according to an embodiment of the present invention will be explained with reference to the drawings.

Figure 5:
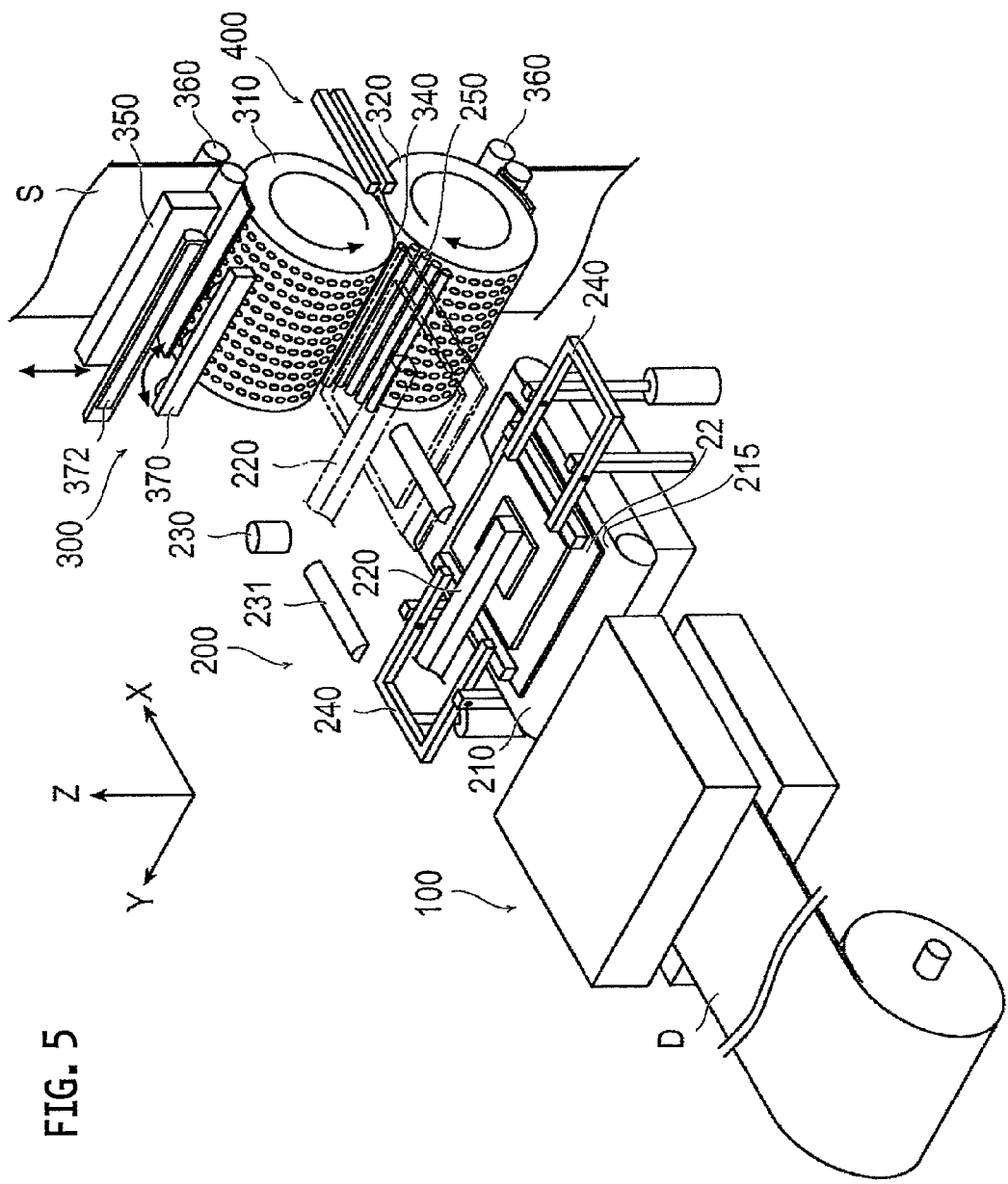
FIG. 5 is a schematic perspective view illustrating a stacking apparatus.
Figure 6:
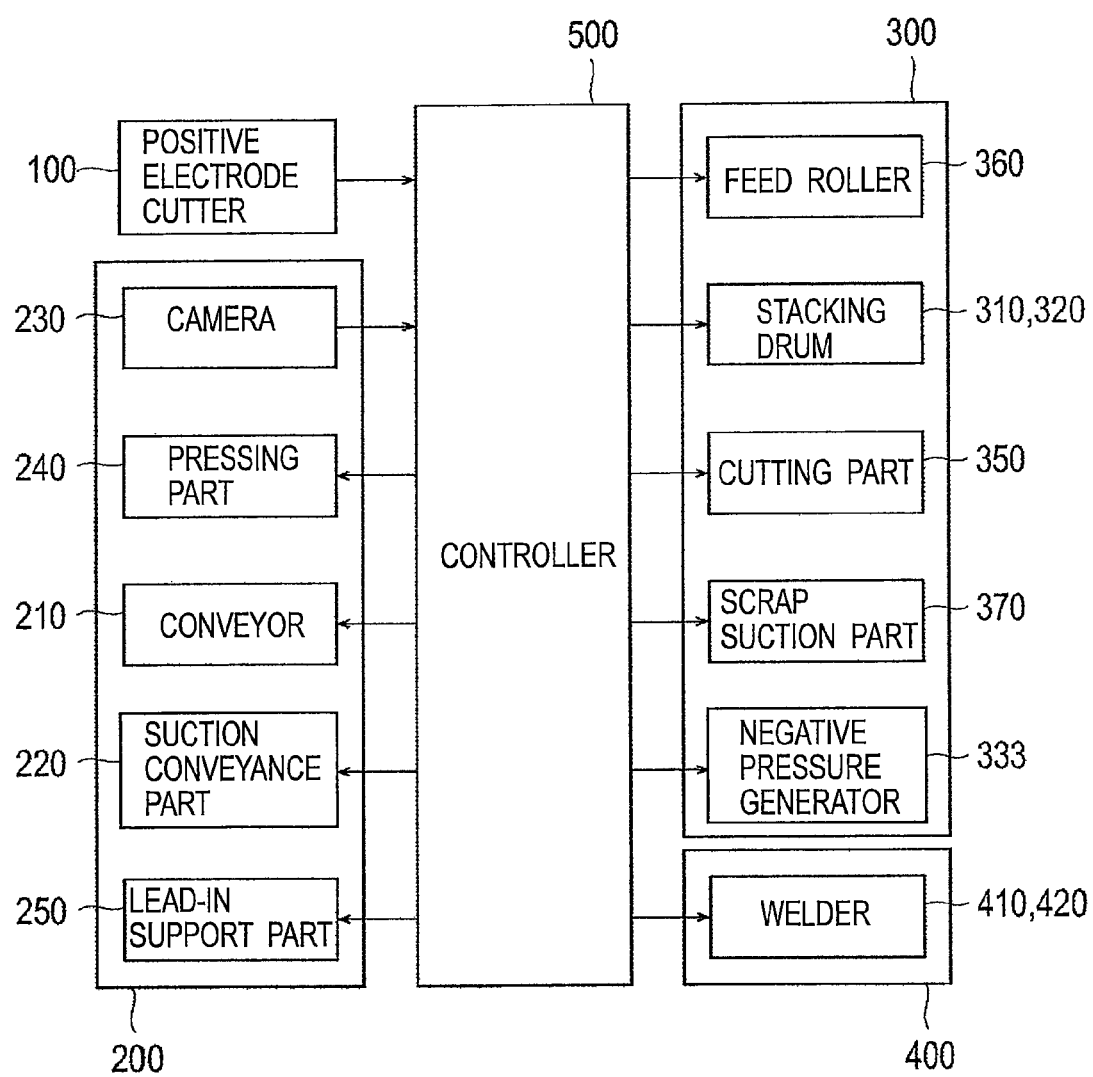
FIG. 6 is a view illustrating an electric configuration of the stacking apparatus.

As illustrated in FIGS. 5 and 6, the stacking apparatus has a positive electrode cutting unit 100 that cuts a positive electrode 22 from a positive electrode sheet material D, an electrode conveyance unit 200 that conveys the cut positive electrode 22, a rotary conveyance unit 300 that is arranged downstream from the electrode conveyance unit 200 in a conveying direction, a weld unit 400 arranged on each side of the rotary conveyance unit 300, and a controller (control unit) 500 that generally controls the whole of the apparatus. According to the embodiment, the direction in which the positive electrode is conveyed is a conveying direction X, the direction orthogonal to a plane of the positive electrode 22 is a vertical direction Z, and the direction crossing the vertical direction Z and conveying direction X is a width direction Y. Based on these directions, the following explanation is made.

The positive electrode cutting unit 100 cuts the positive electrode sheet material D in a roll into a predetermined shape by, for example, punching to form the positive electrode (sheet material) 22 of the predetermined shape. The cut positive electrode 22 is rectangular and has the positive tab 23.

Figure 7:
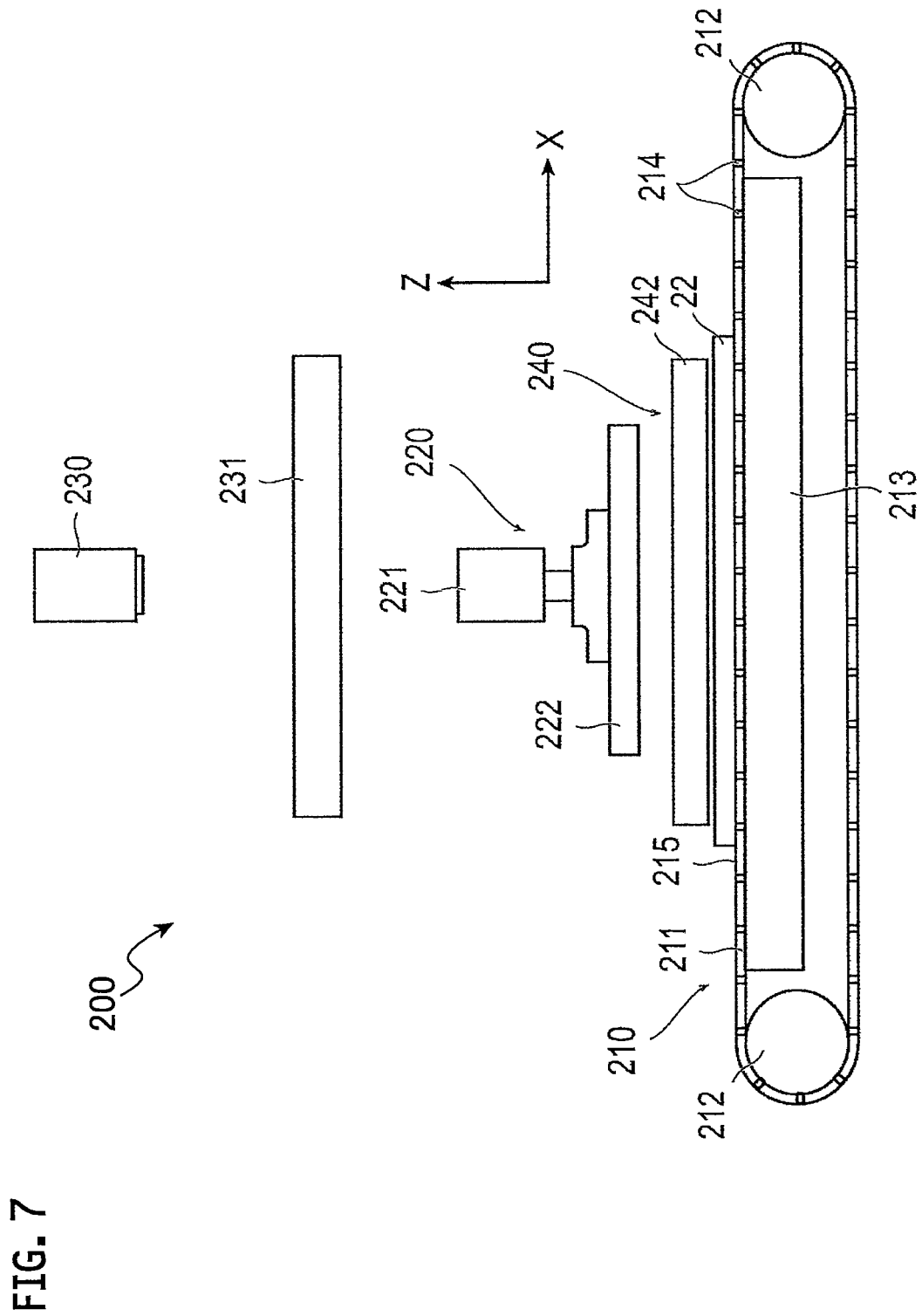
FIG. 7 is a side view illustrating an electrode conveyance unit of the stacking apparatus.
Figure 8:
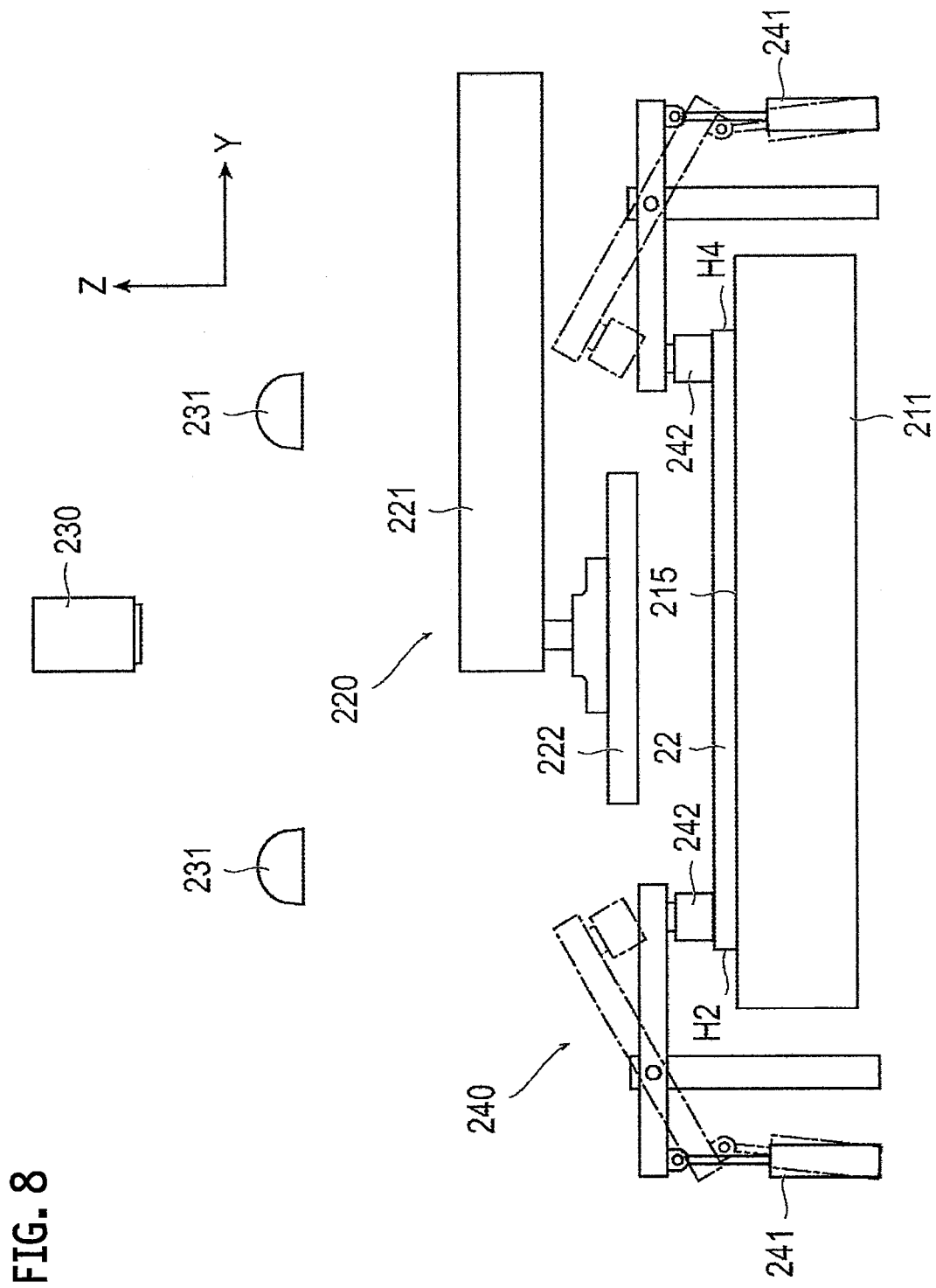
FIG. 8 is a front view illustrating the electrode conveyance unit of the stacking apparatus.
Figure 9:
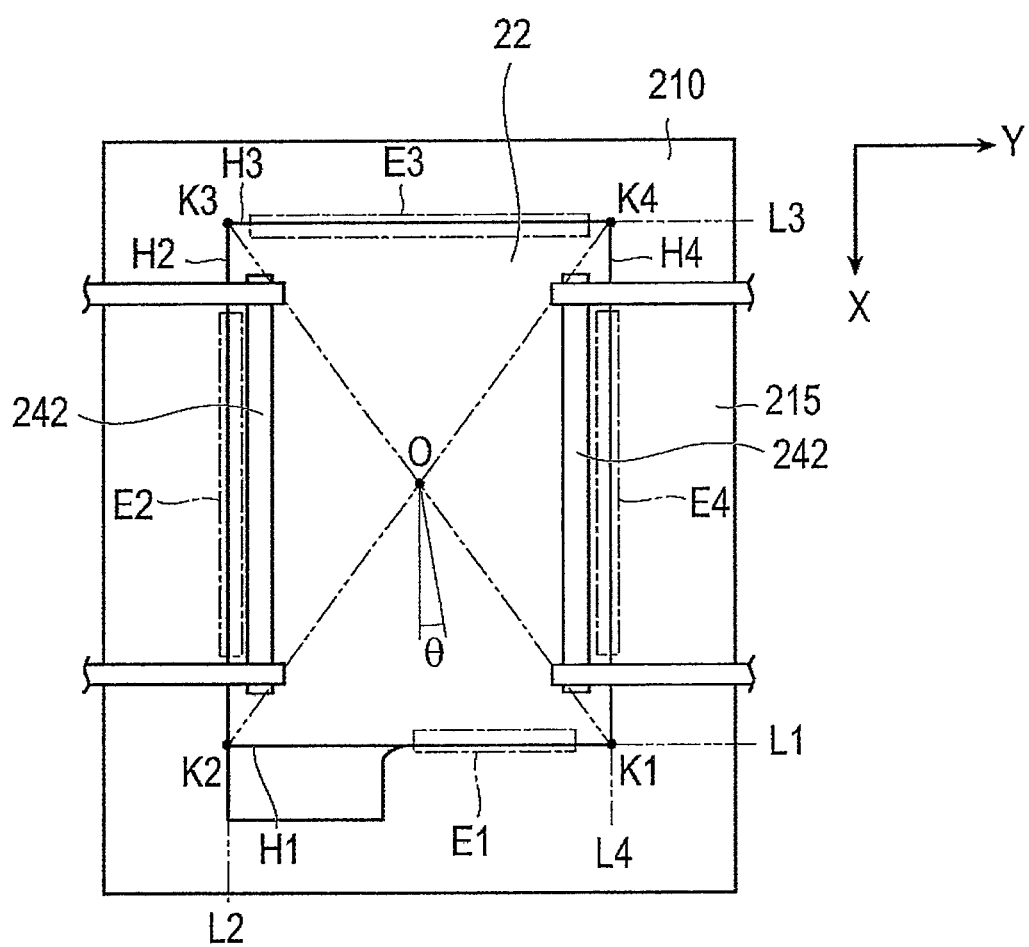
FIG. 9 is a plan view illustrating the electrode conveyance unit of the stacking apparatus.

As illustrated in FIGS. 7 to 9, the electrode conveyance unit 200 has a conveyor 210 that conveys the positive electrode 22 cut by the positive electrode cutting unit 100 and a suction conveyance part 220 that draws the positive electrode 22 by suction from the conveyor 210 and holds and carries the same to the rotary conveyance unit (separator conveyance unit) 300. Above the conveyor 210, an image pickup camera (position detector) 230 and an illuminator 231 are arranged.

The conveyor 210 has a suction belt that is endless and has air permeability, two rotary shafts 212 that are arranged in parallel in the conveying direction and rotatably hold the suction belt 211, and a negative pressure generator 213 that is arranged inside the suction belt 211.

The suction belt 211 is provided with a plurality of air suction holes 214 through which air is sucked by the negative pressure generator 213 so that the positive electrode 22, which is thin and is difficult to convey, is drawn to and held by a flat mounting surface (reference surface) 215 of the conveyor 210. The mounting surface 215 of the suction belt 211 has a color so that a boundary of the positive electrode 22 is easily recognizable with the image pickup camera 230. According to the embodiment, the color is white.

According to the present embodiment, the conveyor 210 is employed as a device having the flat mounting surface 215 on which the positive electrode 22 is substantially horizontally placed. As such a device, any other implement is adoptable.

On each side of the conveyor 210, a pressing part 240 is arranged to press a side of the positive electrode 22 on the suction belt 211. The pressing part 240 has a clamper 242 that is moved by an actuator 241 under the control of the controller 500 toward and away from the mounting surface (reference surface) 215 of the suction belt 211. The clamper 242 presses the positive electrode 22 against the mounting surface 215, thereby correcting a distortion of the positive electrode 22. In particular, the positive electrode 22 that is cut out of the sheet material D wound in a roll has a peculiarity of curling due to a residual rolled characteristic. The positive electrode 22, negative electrode 30, and separator 40 each are very thin foil-like material and very easily deform in the case of a large-sized battery such as a car battery.

The suction belt 211 is to draw and hold by suction a member that is in contact with the mounting surface 215 and suction force provided for the suction belt 211 is not so strong to draw a part that is separated away from the mounting surface 215. Accordingly, the clamper 242 pushes the positive electrode 22 toward the mounting surface 215, to correct a deformation of the positive electrode 22. With this, the image pickup camera 230 is able to correctly catch the position of the positive electrode 22 and a suction position for the suction conveyance part 220 is able to be precisely set, thereby improving a processing accuracy in later stages.

To secure the suction position of the positive electrode 22 by the suction conveyance part 220, the clamper 242 is capable of pressing long sections of two sides (edges) H2 and H4 extending in the conveying direction of the positive electrode 22 on the suction belt 211. In addition, to make the image pickup camera 230 photograph the four sides (edges) H1 to H4 of the positive electrode 22, the clamper 242 is formed to press inner sides of the four sides H1 to H4 (a central side of the positive electrode 22). The clamper 242 is made of a transparent material so that the pressed positive electrode is photographed through the clamper 242. The transparent material may be acryl resin, glass, or the like. The transparent material, however, is not particularly limited and is properly chosen according to the frequency of the illuminator 231 and the image pickup characteristics of the image pickup camera 230.

The suction conveyance part 220 has a carrier body 221 that is connected to a driving device (not illustrated) and is movable and a suction head 222 that is arranged under the carrier body 221 and is connected to a negative pressure supply source (not illustrated) to generate suction force. The suction head 222 is driven by the driving device and is three-dimensionally movable in the vertical direction Z, conveying direction X, and width direction Y and turnable in a horizontal plane.

The image pickup camera 230 arranged above the conveyor 210 photographs under the illuminator 231 the positive electrode 22 that is conveyed by the conveyor 210 and pressed and held by the clamper 242. When the positive electrode 22 is conveyed to and stopped at a predetermined position, the image pickup camera 230 photographs the positive electrode 22 and transmits a signal based on the image to the controller 500. Receiving the signal, the controller 500 calculates the position and state of the positive electrode 22 according to the signal, controls the movement of the driving device of the suction conveyance part 220 according to the calculated results, properly corrects the position and attitude of the positive electrode 22, and conveys the positive electrode 22 to a gap 340 (refer to FIG. 5) of the rotary conveyance unit 300 to be explained later.

More precisely, the image photographed with the image pickup camera 230 at the predetermined position where the conveyor 210 is stopped is used to detect edges of side areas E1 to E4 corresponding to the four sides of the positive electrode 22. The edges are detectable according to a color difference between the suction belt 211 and the positive electrode 22. According to the detected result, approximate straight lines L1 to L4 of the four sides are calculated with the use of a least square method. Thereafter, intersections of the four approximate straight lines L1 to L4, i.e., four corners K1 to K4 are calculated. An average of the four corners K1 to K4 is calculated as coordinates of an electrode center O. The coordinates of the electrode center O are expressed with coordinates in the conveying direction X and width direction Y.

According to an average of one or both of the approximate straight lines L2 and L4 of the two sides H2 and H4 of the positive electrode 22 in the conveying direction, an inclination angle θ on the horizontal plane (reference plane) of the positive electrode 22 is calculated. Thereafter, according to the coordinates of the electrode center O and inclination angle θ, correction amounts for the position and inclination of the positive electrode 22 with respect to a true position on the horizontal plane are calculated. According to the correction amounts, the driving device of the suction conveyance part (position corrector) 220 is controlled to correct the position and attitude of the positive electrode 22 and carry the positive electrode 22 into the gap 340 of the rotary conveyance unit 300.

Although the embodiment recognizes the position and state of the positive electrode 22 according to the image obtained by the image pickup camera 230, it is possible to employ other sensors for this purpose. For example, a contact sensor for detecting a front end of the positive electrode 22 may be employed to recognize the position of the positive electrode 22.

After the positive electrode 22 is conveyed to the predetermined position on the conveyor 210 and the clamper 242 presses the sides of the positive electrode 22 to correct the shape of the positive electrode 22, the suction conveyance part 220 is vertically lowered and the suction head 222 draws and holds the positive electrode 22. The clamper 242 releases the positive electrode 22 and the suction conveyance part 220 is lifted while substantially keeping the horizontal state of the positive electrode 22. According to the calculated correction amounts, the position and attitude of the positive electrode 22 are properly corrected and the positive electrode 22 is carried into the gap 340 of the rotary conveyance unit 300.

Figure 10:
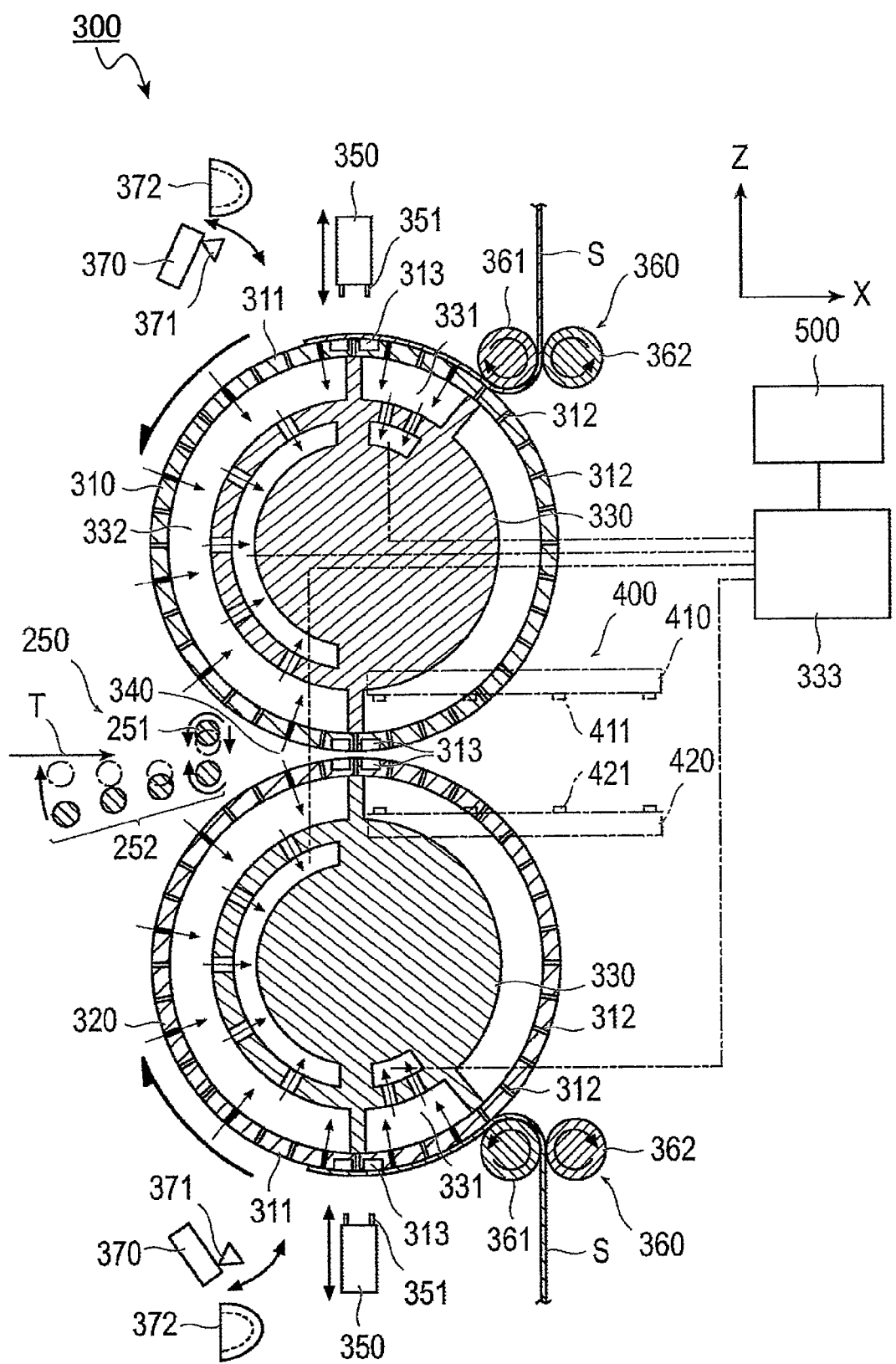
FIG. 10 is a schematic sectional view illustrating a rotary conveyance unit of the stacking apparatus.

In the vicinity of the gap 340 of the rotary conveyance unit 300, a lead-in support part 250 is arranged as illustrated in FIG. 10. The lead-in support part 250 is arranged on upper and lower sides of the gap 340 to guide the positive electrode 22 into the rotary conveyance unit 300. The lead-in support part 250 has a plurality of roller groups to support the positive electrode 22 conveyed from the suction conveyance part 220 and feed the positive electrode 22 into the gap 340 of the rotary conveyance unit 300.

The lead-in support part 250 has an upper lead-in support 251 having a roller and a lower lead-in support 252 having a plurality of rollers. The upper lead-in support 251 is movable in the vertical direction Z to an upper as an "open state" and a lower as a "closed state" that holds the positive electrode 22 with respect to the most downstream one in the conveying direction of the rollers of the lower lead-in support 252. The upper lead-in support 251 is driven to feed the positive electrode 22 into the gap 340.

The lower lead-in support 252 becomes an open state when the roller on the upstream side of the conveying direction is obliquely lowered and a closed state when lifted to a nearly horizontal position to receive the positive electrode 22 from the suction conveyance part 220. The lower lead-in support 252 supports the positive electrode 22 so that the positive electrode 22 can be conveyed (refer to FIG. 14). The most downstream roller in the conveying direction forms a pair with the roller of the upper lead-in support 251 and is driven to rotate to feed the positive electrode 22 held with respect to the upper lead-in support 251 into the gap 340.

When the positive electrode 22 is conveyed from the suction conveyance part 220, the upper lead-in support 251 is lowered to hold a front end of the positive electrode 22 with respect to the lower lead-in support 252. At the same time, the rollers of the lower lead-in support 252 are lifted to nearly a horizontal state to support the bottom surface of the positive electrode 22. Thereafter, the positive electrode 22 is released from the suction head 222 of the suction conveyance part 220, and according to the rotation of the lead-in support part 250, is gradually fed into the gap 340 of the rotary conveyance unit 300.

The rotary conveyance unit (separator conveyance unit) 300 cuts separators 40 from sheet-like separator materials S and lays the separators 40 on the positive electrode 22 carried by the suction conveyance part 220. The rotary conveyance unit 300 has an upper cylindrical stacking drum (first separator conveyance unit, cylindrical rotor) 310 and a lower cylindrical stacking drum (second separator conveyance unit, cylindrical rotor) that form a pair.

The pair of upper and lower stacking drums 310 and 320 have rotary axes orthogonal to the conveying direction X and are arranged to be parallel with each other with their outer circumferential surfaces 311 facing each other with the predetermined gap 340 between them. The drums 310 and 320 are structured to be symmetrical with respect to a horizontal plane.

The outer circumferential surface 311 of each of the stacking drums 310 and 320 is provided with a suction part to draw the separator 40 by suction. The stacking drums 310 and 320 each incorporate an internal structure 330 that is not rotatable. The width (the length in the rotation axis direction) of the stacking drums 310 and 320 is so set that each edge of the separator material S may protrude from each end of the stacking drums 310 and 320.

The upper and lower stacking drums 310 and 320 are arranged to form the gap 340 between them. At the gap 340, the drums 310 and 320 circumferentially turn in the same direction toward the downstream side of the conveying direction X. Namely, the upper stacking drum 310 rotates left in the plane of FIG. 10, to convey the separator 40 drawn and held by the outer circumferential surface 311 to the gap 340. The lower stacking drum 320 rotates right in the plane of FIG. 10, to convey the separator 40 drawn and held by the outer circumferential surface 311 to the gap 340. The upper and lower stacking drums 310 and 320 are driven by a driving motor (not illustrated) whose rotation is controlled by the controller 500.

The outer circumferential surface 311 of each of the stacking drums 310 and 320 has countless air holes 312. At circumferential parts of each of the drums 310 and 320, a recess (receiver) 313 is formed to receive a separator cutter (cutting blade) 351 of a cutting part 350 to be explained later. The recess 313 is formed at two locations separated by 180 degrees on each of the stacking drums 310 and 320. The reason why the recess 313 is formed at two locations in the circumferential direction is to cut two separators 40 during a turn of the stacking drums 310 and 320. Depending on the number of separators 40 to be cut during a turn of the stacking drums 310 and 320, the number of the recesses 313 in the circumferential direction is changed.

Arranged in the vicinity of the outer circumferential surface 311 of each of the stacking drums 310 and 320 are a feed roller part (lock mechanism) 360 to feed or hold the sheet-like separator material S, the cutting part 350 to cut the separator material S on the outer circumferential surface 311, and a scrap suction part 370 to reclaim a scrap S' (refer to FIG. 15) produced by the cutting part 350.

The feed roller part 360 that is small and cylindrical is arranged at each of obliquely upper and lower positions on the downstream side of the conveying direction of the rotary conveyance unit 300.

At each of the obliquely upper and lower positions on the downstream side of the conveying direction of the rotary conveyance unit 300, the feed roller part 360 has a pair of feed rollers 361 and 362 that are cylindrical and are spaced away from each other by a predetermined gap. The feed roller part 360 holds in the gap the single continuous separator material S conveyed from a separator roll (not illustrated), turns to feed the same to the rotary conveyance unit 300, and stops to hold the separator material S. The feed rollers 361 and 362 are controlled by the controller 500, to feed the separator material S to the rotary conveyance unit 300 at predetermined timing.

The cutting part 350 has the separator cutters 351 at upper and lower positions of the rotary conveyance unit 300. Each separator cutter 351 is a thermal cutting part that fuses the separator material S drawn and held by the outer circumferential surface 311 of the stacking drum 310 (320) and cuts the material S into a predetermined shape.

More precisely, the separator 40 is drawn and held by the outer circumferential surface 311 of each of the stacking drums 310 and 320 and is conveyed to a position where the recess 313 of the stacking drum faces the separator cutter 351. Then, the separator cutter 351 receives an instruction from the controller 500 to enter the recess 313 of the stacking drum, fuse the separator 40, and cut the same into a predetermined shape as illustrated in FIG. 3(A). When continuously cutting the separators 40 from the separator material S, a rear end of a first separator 40 is set to be the side 44B where the fitting part 43 is formed and a front end of a second separator 40 is set to be the linear side 44A. When the cutting part 350 simultaneously cuts the two sides 44A and 44B having different shapes, a marginal scrap S' is produced.

The scrap suction part 370 has a cutter suction head 371 to generate suction force. When the separator cutter 351 cuts the separator material S and retracts from the recess 313, the scrap suction part 370 approaches the cut part and draws and holds by suction the scrap S' of the separator 40 cut by the separator cutter 351. The cutter suction head 371 holding the scrap S' is moved away from the outer circumferential surface 311 of the stacking drum 310 (320). Thereafter, the suction by the cutter suction head 371 is stopped to release the scrap S', which is drawn and collected by a suction port 372 that is separately arranged at a position away from the outer circumferential surface 311 of the stacking drum 310 (320).

If only the suction port 372 is arranged to reclaim the scrap S', the scrap S' may interfere with the separator or the separator material S left on the outer circumferential surface 311. Drawing by suction and separating the scrap S' with the cutter suction head 371 and then collecting the scrap S' with the suction port 372 reclaim the scrap S' without damaging the separator 40 or separator material S.

The internal structure 330 inside each of the stacking drums 310 and 320 includes a first negative pressure chamber 331 that is capable of adjusting the strength of negative pressure according to a process carried out by the apparatus and a second negative pressure chamber 332 that substantially maintains constant negative pressure during operation of the apparatus. The first and second negative pressure chambers 331 and 332 are not rotatable and are connected to a negative pressure supply device 333 having a pressure adjusting valve. The controller 500 controls the negative pressure supply device 333 to adjust internal pressure of the first and second negative pressure chambers 331 and 332.

The first negative pressure chamber 331 and second negative pressure chamber 332 are isolated from the outside by an inner circumferential surface of the stacking drum 310 (320), to non-rotatably generate through the air holes 312 formed in the stacking drum 310 (320) negative pressure areas on the outer circumferential surface 311 of the stacking drum. These areas do not rotate even if the stacking drums rotate.

The first negative pressure chamber 331 is formed in the range from a position corresponding to the feed roller part 360 to a position corresponding to the separator cutter 351 in the rotation direction of the stacking drum 310 (320). The second negative pressure chamber 332 is formed in the range of about 180 degrees from the position corresponding to the separator cutter 351 to a position corresponding to the gap 340 in the rotation direction of the stacking drum.

On the outer circumferential surface 311 of each of the stacking drums 310 and 320, there are formed (refer to FIG. 11) a slip area (suction force adjusting area) A1, where negative pressure is adjusted and changed, at a position corresponding to the first negative pressure chamber 331 and a suction area A2, where negative pressure is nearly constant, at a position corresponding to the second negative pressure chamber 332 to draw and hold the separator material S or the cut separator 40. The suction area A2 has strong suction force to hold the separator material S or the cut separator 40 by the suction force and turn the same according to the rotation of the stacking drum.

The slip area A1 can be set to provide nearly the same suction force as the suction area A2 to turn the separator 40, or lower suction force to hold the separator material S so that the separator material S is not separated from the outer circumferential surface 311, and when the stacking drums 310 and 320 are turned, slips on the outer circumferential surface 311 without turning together with the stacking drum.

In the internal structure 330, a range from a position corresponding to the gap 340 to the position corresponding to the feed roller part 360 in the rotation direction of the stacking drum 310 (320) does not contain the first negative pressure chamber 331 or the second negative pressure chamber 332. Accordingly, part of the outer circumferential surface 311 corresponding to this range produces no negative pressure and forms a non-rotatable non-suction area A3 where the separator 40 is not drawn by suction.

In the rotary conveyance unit 300, each of the stacking drums 310 and 320 cuts, draws by suction, holds, and conveys the separator 40. The rotation of the stacking drums 310 and 320 and the conveyance speed of the electrode 22 by the electrode conveyance unit 200 are synchronized with each other to gradually stack the separators 40 on each face of the positive electrode 22 from the downstream side of the conveying direction X. At this time, the suction conveyance part 220 carries the electrode 22 in a tangential direction T (refer to FIG. 10) of the cylindrical stacking drums 310 and 320.

The weld unit 400 welds edges of the separators 40 stacked on each face of the positive electrode 22 to each other (refer to FIG. 3). The weld unit 400 has a pair of upper and lower welders 410 and 420 at each end of the rotation axis of each of the stacking drums 310 and 320.

The upper and lower welders 410 and 420 each have a plurality of projections 411 (412) in the conveying direction X on a surface opposing the counterpart. The opposing projections 411 and 421 press and heat the separators 40 to weld them together.

The welders 410 and 420 are movable in the conveying direction X and vertical direction Z. In synchronization with the stacked separators 40 and positive electrode 22 conveyed into the gap 340, the welders 410 and 420 are moved at the same speed in the conveying direction X. At this time, the opposing projections 411 and 421 join the stacked separators 40 to each other, thereby forming joints 42.

The positive electrode 22 packaged in the separators is conveyed to a predetermined position where the welders 410 and 420 are separated away from each other and are moved to the upstream side of the conveying direction. The welders 410 and 420 are again moved at the same speed in the conveying direction X and toward each other, to weld and form other joints 42. When all joints 42 are formed, the welders 410 and 420 are separated away from each other and the packaged positive electrode 20 is released.

The mechanism for joining the separators 40 is not limited to the above-mentioned mechanism. For example, the separators 40 may be heated and joined to each other between a pair of revolving heating rollers, or may be pressure-bonded to each other without heating, or may be bonded to each other with an adhesive.

As illustrated in FIG. 6, the controller 500 generally and integrally controls the positive electrode cutting unit 100, image pickup camera 230, pressing part 240, conveyor 210, suction conveyance part 220, lead-in support part 250, feed roller part 360, stacking drums 310 and 320, cutting part 350, scrap suction part 370, negative pressure supply device 333, and weld unit 400, so that they synchronously operate with one another. The controller 500 may generally control the other devices for forming batteries.

A stacking method employing the stacking apparatus will be explained with reference to FIGS. 11 to 19.

A positive electrode sheet material D wound in a roll is cut by the positive electrode cutting unit 100 into a positive electrode 22. The cut positive electrode 22 is placed by a suction pad, conveyor, and the like (not illustrated) onto the mounting surface 215 of the conveyor 210. Each feed roller part 360 holds, in a gap, a single continuous separator material S fed from a separator roll. Accordingly, a front end of the separator material S is positioned at an uppermost part or a lowermost part of the rotary conveyance unit 300 as illustrated in FIG. 11.

The first negative pressure chamber 331 is set to a lower negative pressure so that the separator material S is not pulled out of the slip area A1 of the outer circumferential surface 311 and the stacking drum 310 (320) slips and turns on an inner surface of the separator material S. According to the embodiment, two separators 40 are cut by a turn of the stacking drum 310 (320). Accordingly, as illustrated with two-dot chain lines in FIG. 11, the preceding cut separator 40 is already pulled in and conveyed on the outer circumferential surface 311 of each of the stacking drums 310 and 320.

Figure 11:
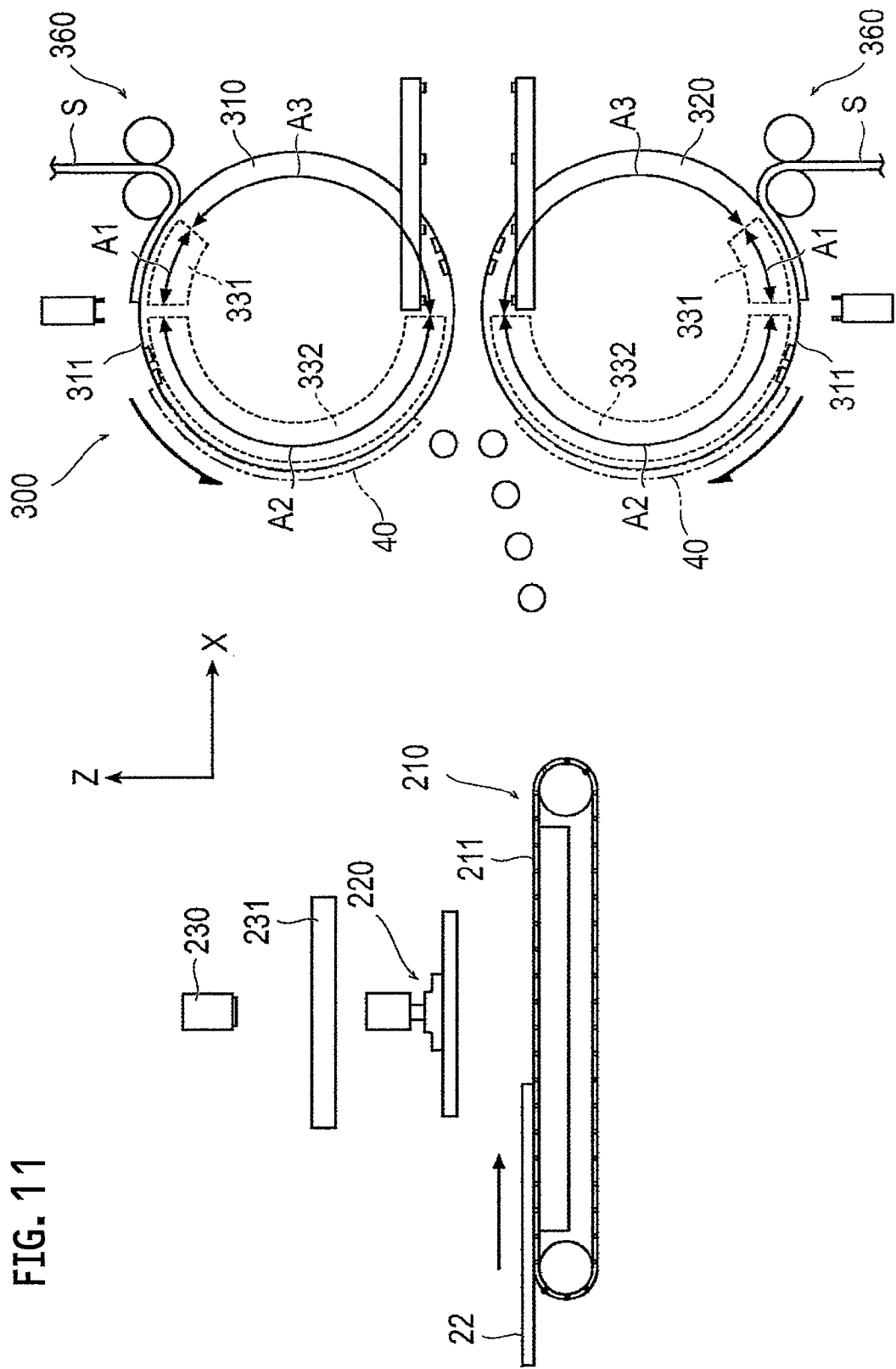
FIG. 11 is a first explanatory view illustrating a process of a stacking method carried out by the stacking apparatus.

As illustrated in FIG. 11, the conveyor 210 conveys the positive electrodes 22 in the conveying direction X in tandem (the tab of each positive electrode being upstream in the conveying direction X) with the suction belt 211 drawing and holding the positive electrodes 22 on the mounting surface 215 of the suction belt 211 to suppress the curling and the like of the positive electrodes 22. It is possible to convey the positive electrodes 22 by arranging them in a lateral direction (the tab of each positive electrode being oriented in the width direction Y).

Figure 12:
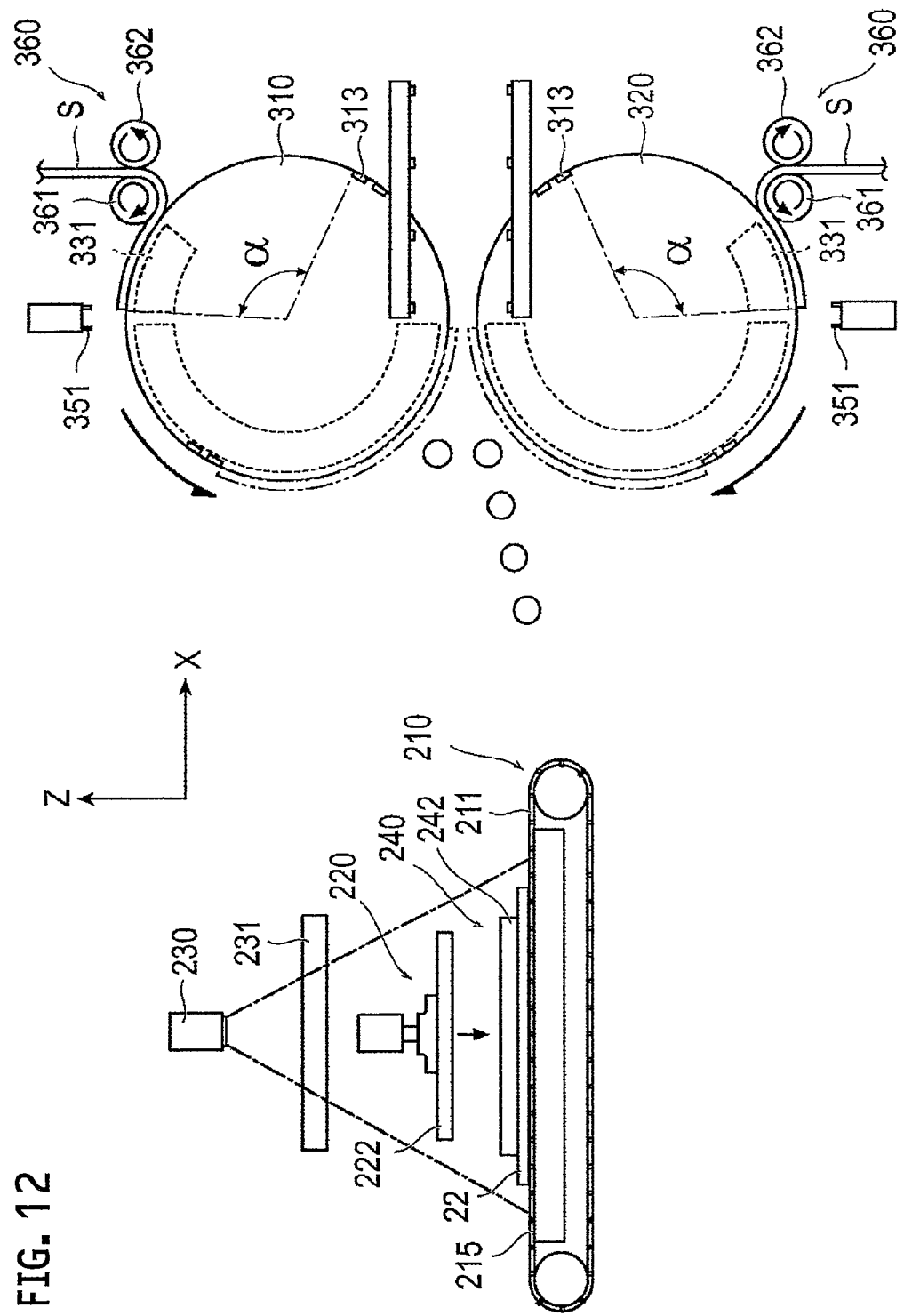
FIG. 12 is a second explanatory view illustrating a process of the stacking method carried out by the stacking apparatus.

When reaching a predetermined position, the suction belt 211 stops while drawing and holding the positive electrodes 22 by suction. As illustrated in FIG. 12, the pressing part 240 is operated so that the clampers 242 press long sections along the two sides H2 and H4 of the positive electrode 22 (refer to FIGS. 8 and 9). This corrects deformation such as curving of the positive electrode 22. Any part of the positive electrode 22 separated away from the suction belt 211 is brought close to the suction belt 211 and is drawn thereby so that the positive electrode 22 is closely attached to the mounting surface 215.

In this state, the image pickup camera 230 photographs the four sides H1 to H4 of the positive electrode 22 and transmits predetermined signals to the controller 500. According to the received signals, the controller 500 calculates the coordinates of an electrode center O and an inclination angle theta as mentioned above and finds a positional correction amount of the positive electrode 22 with respect to a true position and an inclination correction amount thereof. At the time of photographing, the clamper 242 presses an inner side (center side of the positive electrode) of the edges of the four sides H1 to H4 of the positive electrode 22, so that the image pickup camera 230 surely photographs the four sides H1 to H4. The clamper 242 is made of a transparent material, and even if the clamper 242 is in a photographing range, the positive electrode 22 can be photographed through the clamper 242.

Thereafter, the suction head 222 of the suction conveyance part 220 positioned above the suction belt 211 is lowered onto the upper surface of the positive electrode 22. The suction head 222 draws and holds the positive electrode 22. Although the positive electrode 22 is drawn by the suction belt 211, suction force of the suction belt 211 is set to be weaker than that of the suction head 222, or suction by the suction belt 211 is temporarily stopped so that the suction head 222 can remove the positive electrode 22 from the suction belt 211.

The stacking drum 310 (320) turns, and when the recess 313 moving toward the position corresponding to the separator cutter 351 forms the predetermined angle α with respect to the position of the separator cutter 351, the controller 500 increases the negative pressure of the first negative pressure chamber 331 to increase the suction force of the slip area A1. At the same time, the controller 500 rotates the feed roller part 360 to gradually pass the separator material S held between the pair of feed rollers 361 and 362, thereby starting to feed the separator material S (refer to T1 of FIG. 19). With this, the negative pressure increased slip area A1 and the suction area A2 on the outer circumferential surface 311 of the stacking drum 310 (320) draw and hold the separator material S. According to the rotation of the stacking drum 310 (320), the separator material S is gradually fed. The predetermined angle α is an angle corresponding to the length of a single separator 40 to be cut.

Figure 13:
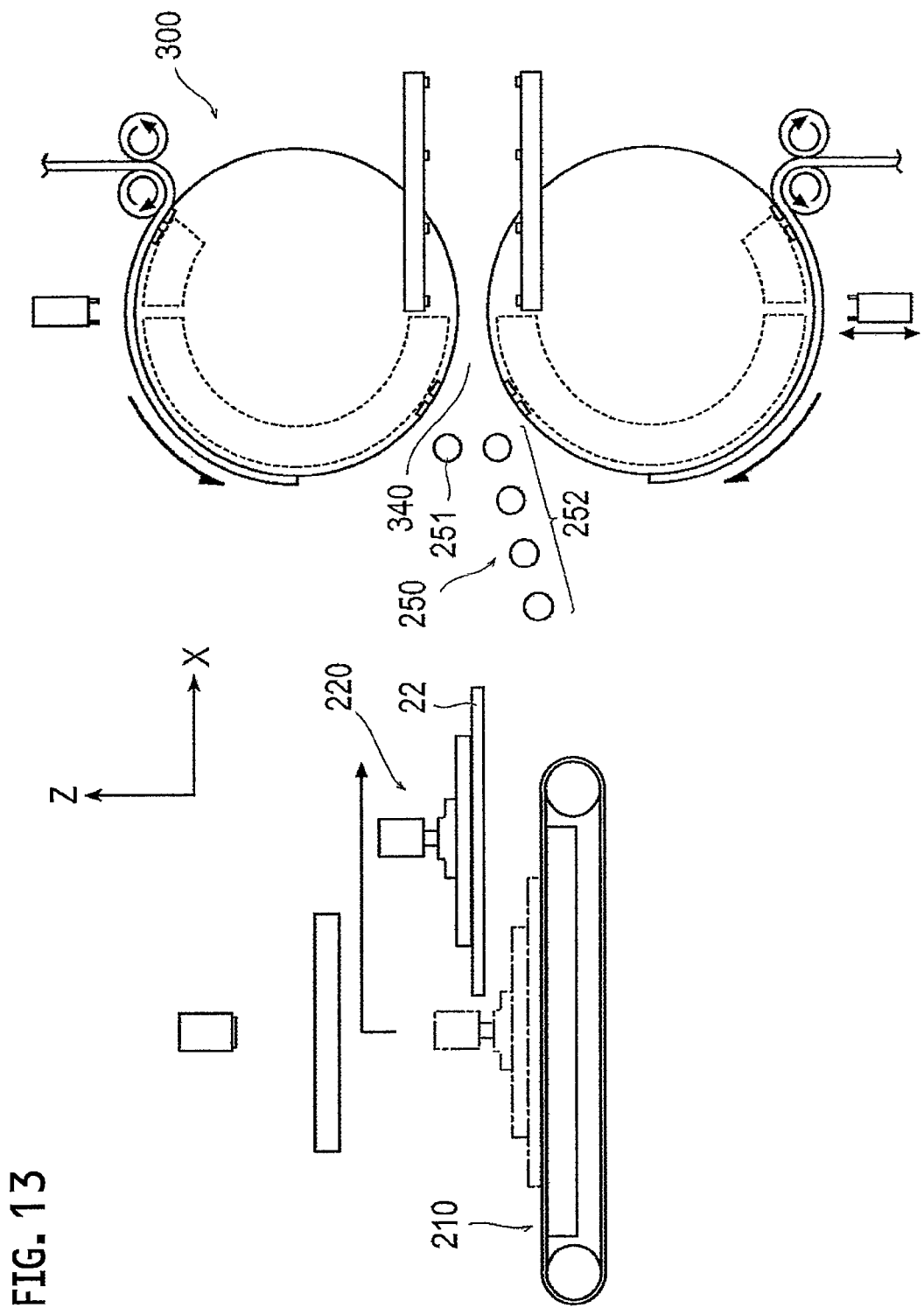
FIG. 13 is a third explanatory view illustrating a process of the stacking method carried out by the stacking apparatus.

As illustrated in FIG. 13, the suction conveyance part 220 holding the positive electrode 22 substantially in a horizontal state is lifted and is moved in the conveying direction X to convey the positive electrode 22 into the gap 340 of the rotary conveyance unit 300. At this time, the controller 500 controls the suction conveyance part 220 so that, during an interval between the drawing of the positive electrode 22 and the conveying of the same to the rotary conveyance unit 300, the position and attitude of the positive electrode 22 are corrected according to the correction amounts. With this, the position of the positive electrode 22 is always precisely maintained to improve a stacking preciseness in the following processes.

Figure 14:
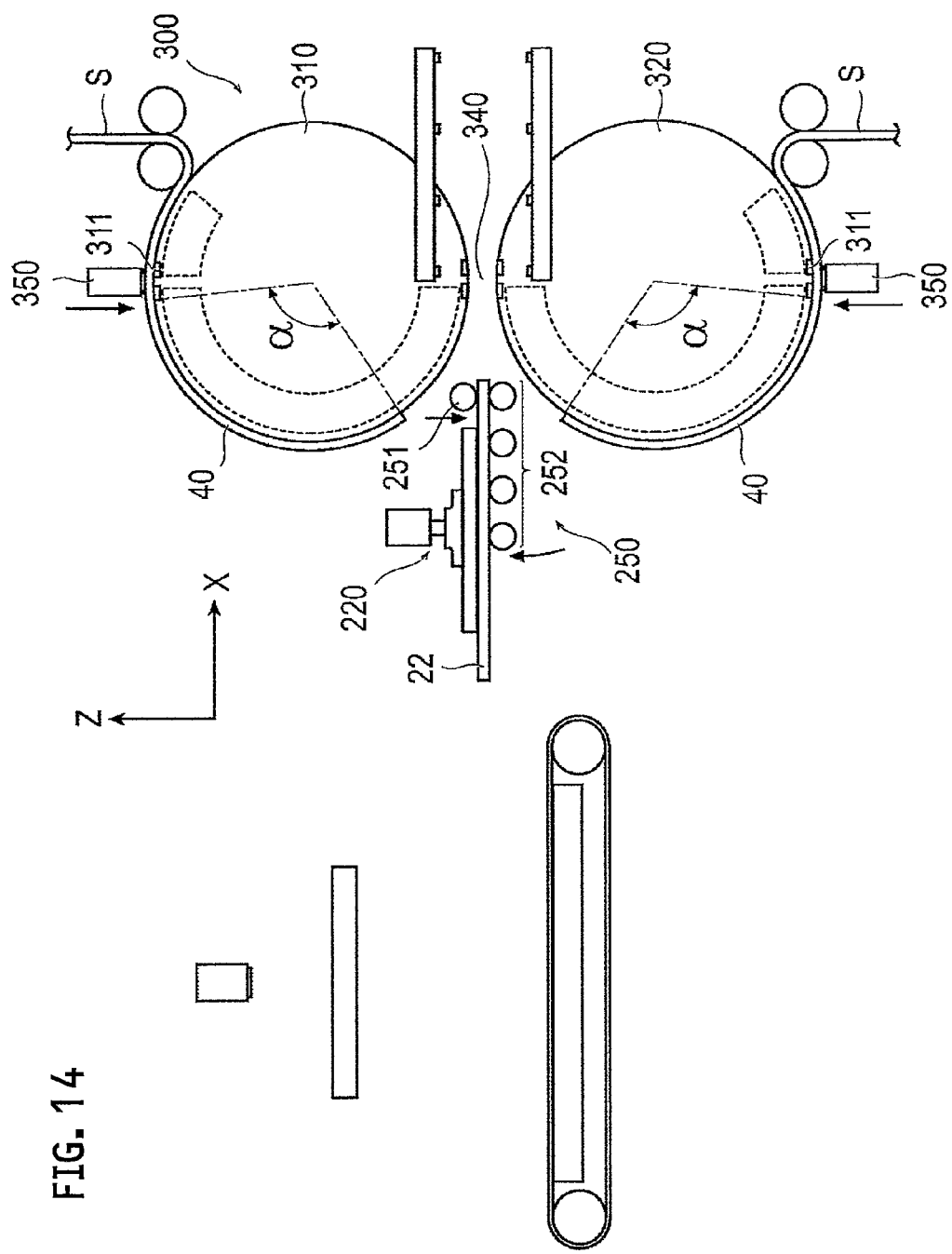
FIG. 14 is a fourth explanatory view illustrating a process of the stacking method carried out by the stacking apparatus.

The positive electrode 22 conveyed by the suction conveyance part 220 reaches the lead-in support part 250 of an open state in front of the gap 340 of the rotary conveyance unit 300. As illustrated in FIG. 14, the lead-in support part 250 lowers the upper lead-in support 251 to hold a front end of the positive electrode 22 with respect to the lower lead-in support 252. At this time, the rollers of the lower lead-in support 252 are ascended substantially to a horizontal state to establish the closed state and support a bottom surface of the positive electrode 22. The positive electrode 22 is released from the suction head 222 of the suction conveyance part 220 and the lead-in support part 250 is rotated to gradually feed the positive electrode 22 into the gap 340 of the rotary conveyance unit 300.

Figure 19:
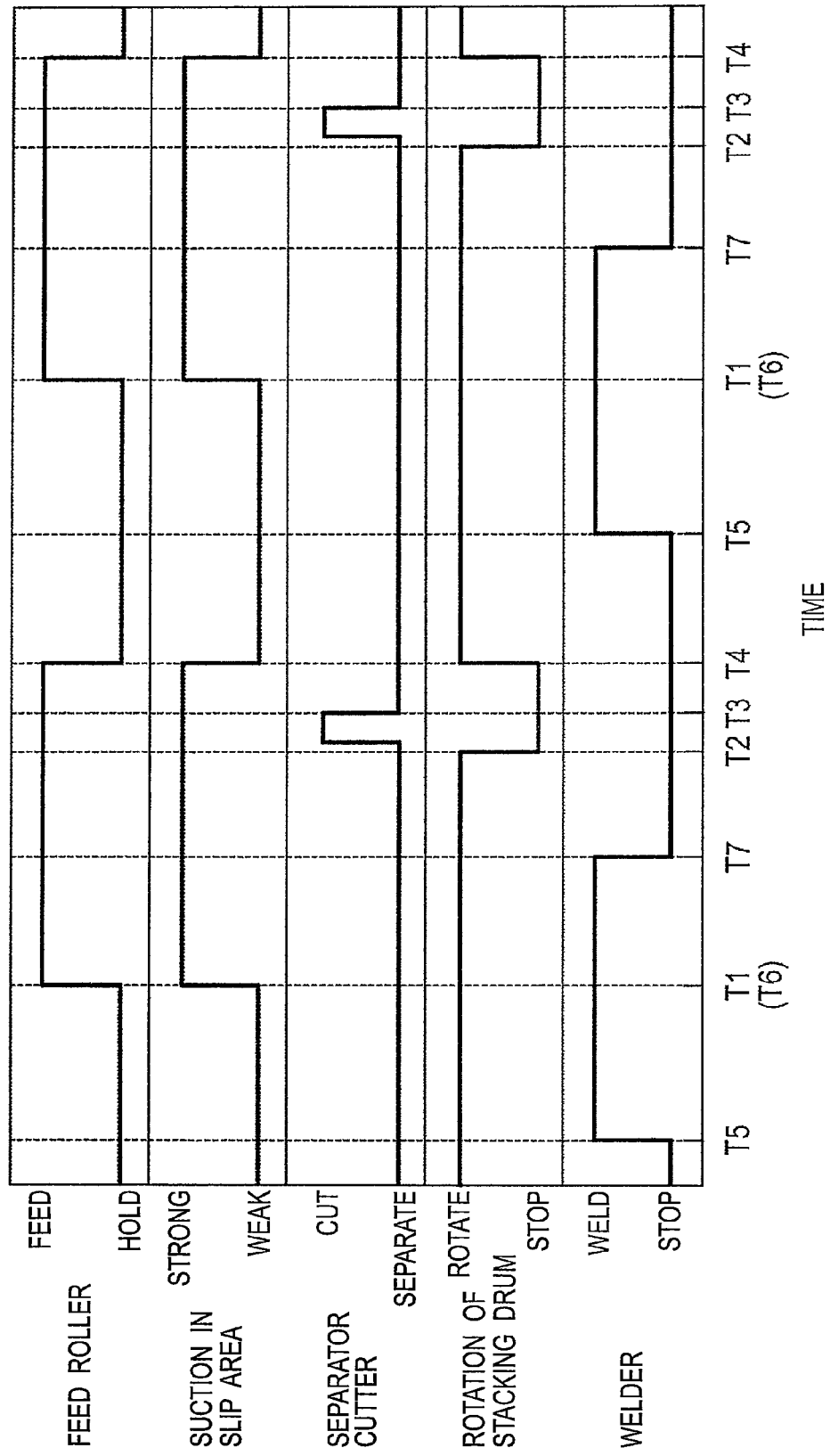
FIG. 19 is a chart illustrating operation of the rotary conveyance unit.

In the rotary conveyance unit 300, the stacking drums 310 and 320 are turned by the angle α from a rotation start point and are stopped (refer to T2 of FIG. 19). At this time, the separator material S is pulled out onto each of the stacking drums 310 and 320 by the angle α corresponding to one separator 40 and each recess 313 is positioned to face the separator cutter 351 of the cutting part 350. According to an instruction from the controller 500, the separator cutter 351 is pressed against the separator material S to cut the separator material S into a predetermined shape, i.e., the separator 40. The cut separator 40 is positioned in the suction area A2 (refer to FIG. 11) of each of the stacking drums 310 320 and is drawn and held by the stacking drum.

Figure 15:
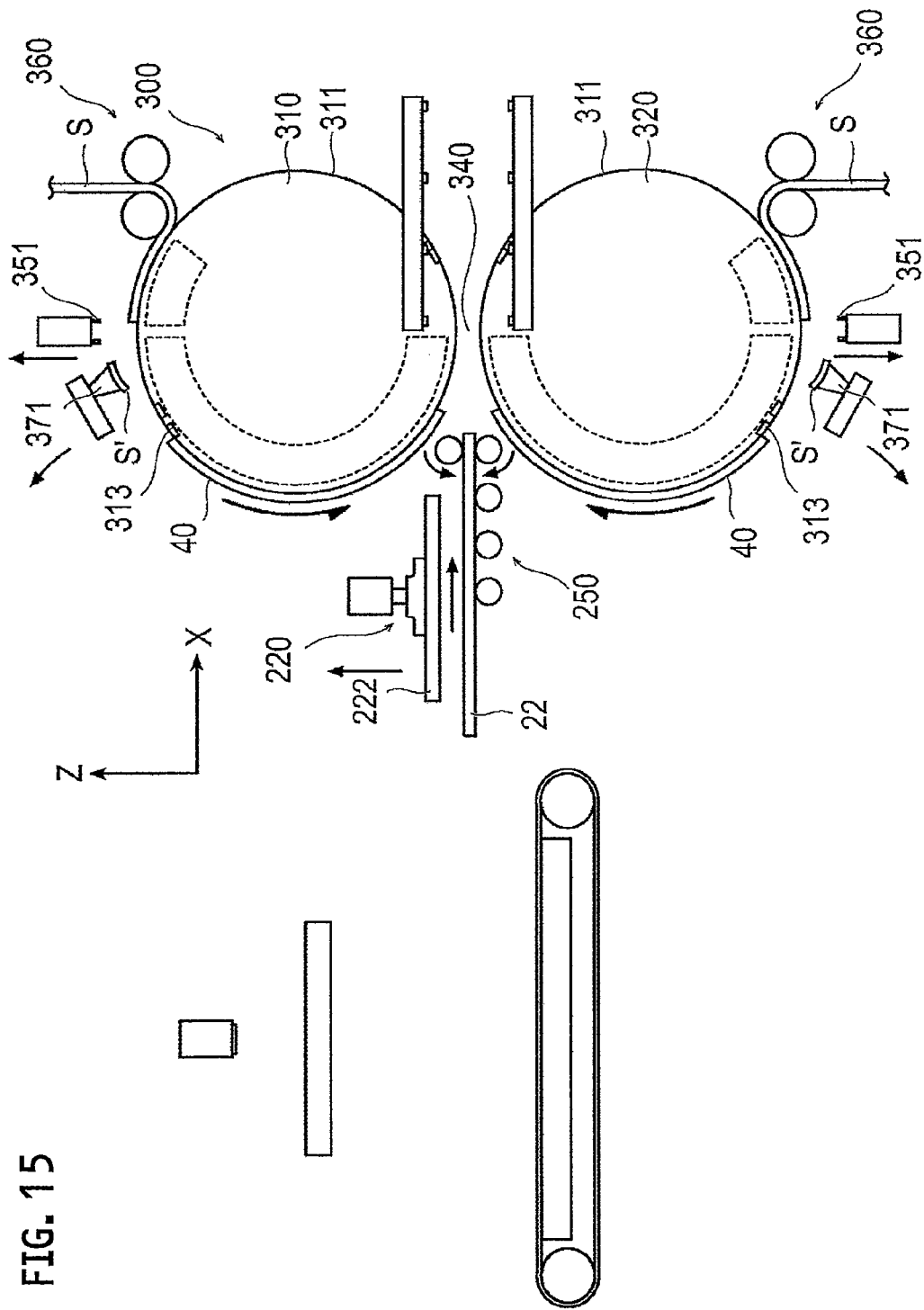
FIG. 15 is a fifth explanatory view illustrating a process of the stacking method carried out by the stacking apparatus.

After cutting the separator material S, the separator cutter 351 is retracted from the recess 313. At this timing (refer to T3 of FIG. 19), the controller 500 instructs the cutter suction head 371 to approach, draw, and hold a scrap S' and retract to an original position as illustrated in FIG. 15. Thereafter, the suction of the cutter suction head 371 is stopped to release the scrap S' and the suction port 372 (refer to FIG. 10) draws and collects the scrap S'.

After the positive electrode 22 is released from the suction head 222 of the suction conveyance part 220, the lead-in support part 250 is turned to gradually feed the positive electrode 22 into the gap 340 between the stacking drums 310 and 320. The stacking drums 310 and 320 are again rotated (refer to T4 of FIG. 19) to convey the cut separators 40 on the stacking drums into the gap 340. At the time of again rotating the stacking drums 310 and 320, the controller 500 decreases the negative pressure of the first negative pressure chamber 331 to weaken the suction force of the slip area A1, and at the same time, makes the feed roller part 360 hold the separator material S (refer to FIG. 18). As a result, the separator 40 is not pulled out of the slip area A1 on the outer circumferential surface 311 and each of the stacking drums 310 and 320 rotates and slides on the inner surfaces of the separator material S.

Figure 16:
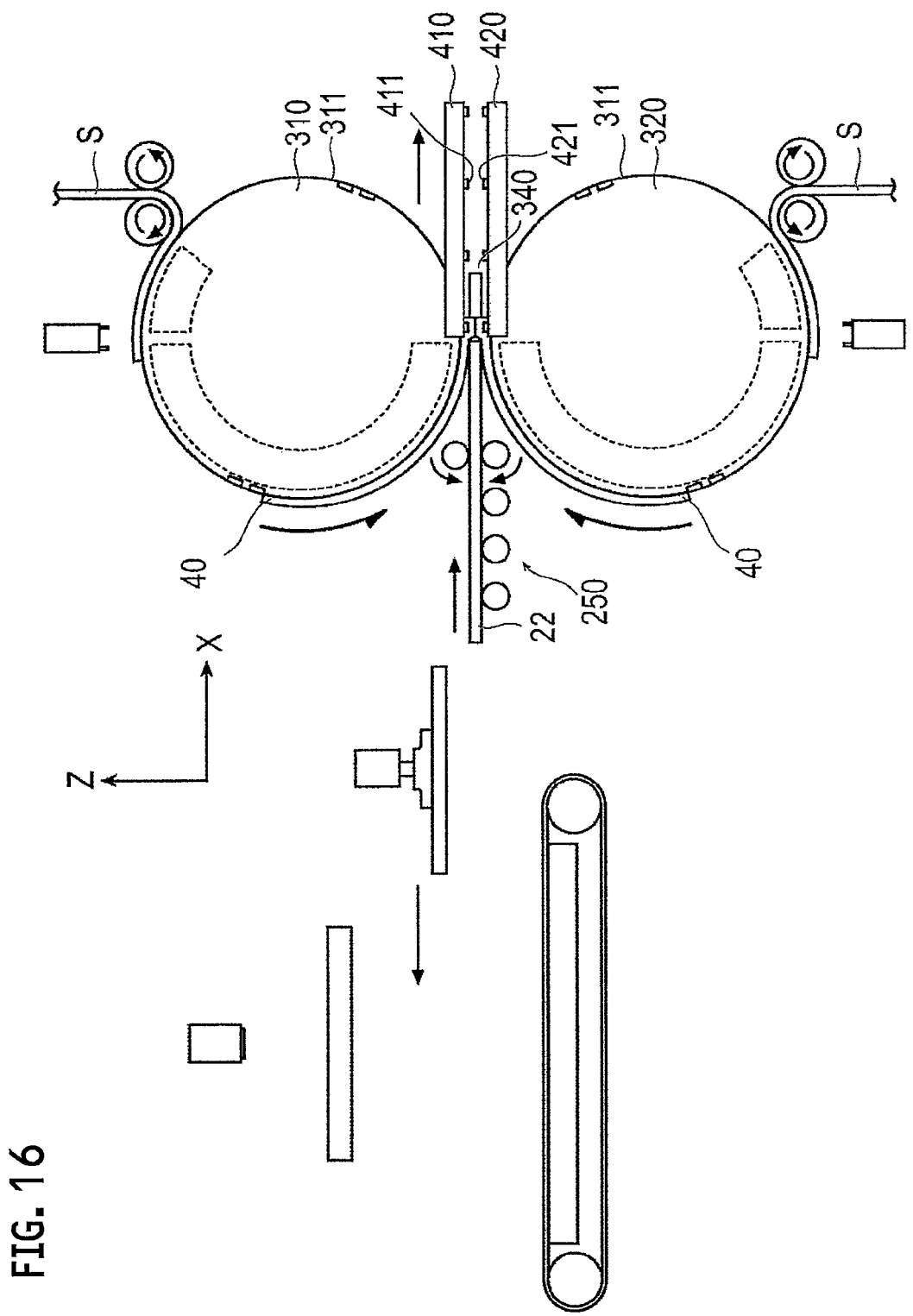
FIG. 16 is a sixth explanatory view illustrating a process of the stacking method carried out by the stacking apparatus.

When a front end of the separator 40 reaches the gap 340 of the rotary conveyance unit 300, the two separators 40 are laid on each other as illustrated in FIG. 16 and the separators 40 are laid on the front end of each surface of the positive electrode 22. At this time, the controller 500 controls the conveying position (conveying timing) and conveyance speed of the suction conveyance part 220 so that the separators 40 and positive electrode 22 move at the same speed and are laid on one another at a preset proper position.

The controller 500 instructs the welders 410 and 420 to approach each other and move in the conveying direction X to hold only the front end of each edge of the separators 40. The separators 40 and positive electrode 22 are kept moving in the conveying direction X and the projections 411 and 421 weld the edges of the separators 40 (refer to T5 of FIG. 19). The separators 40 pass the gap and reach the non-suction areas A3 of the stacking drums 310 and 320. At there, the separators 40 receive no suction force, separate from the outer circumferential surfaces 311 of the stacking drums 310 and 320, and are gradually conveyed in the conveying direction X with the positive electrode 22 held between them.

At this time, the front ends of the separators 40 are joined together, and therefore, the separators 40 are not separated from each other even if the separators 40 are removed from the outer circumferential surfaces 311 of the stacking drums 310 and 320. The positive electrode 22 is continuously conveyed substantially in a horizontal state in the conveying direction X by the lead-in support part 250 in synchronization with the stacking drums 310 and 320. The separators 40 drawn and held by the outer circumferential surfaces 311 of the stacking drums 310 and 320 are gradually laid on each surface of the positive electrode 22 according to the rotation of the stacking drums 310 and 320. At this time, the suction force of each slip area A1 is again increased and the feed roller part 360 starts feeding the separator material S (refer to T6 of FIG. 19) to cut the next separator 40.

Figure 17:
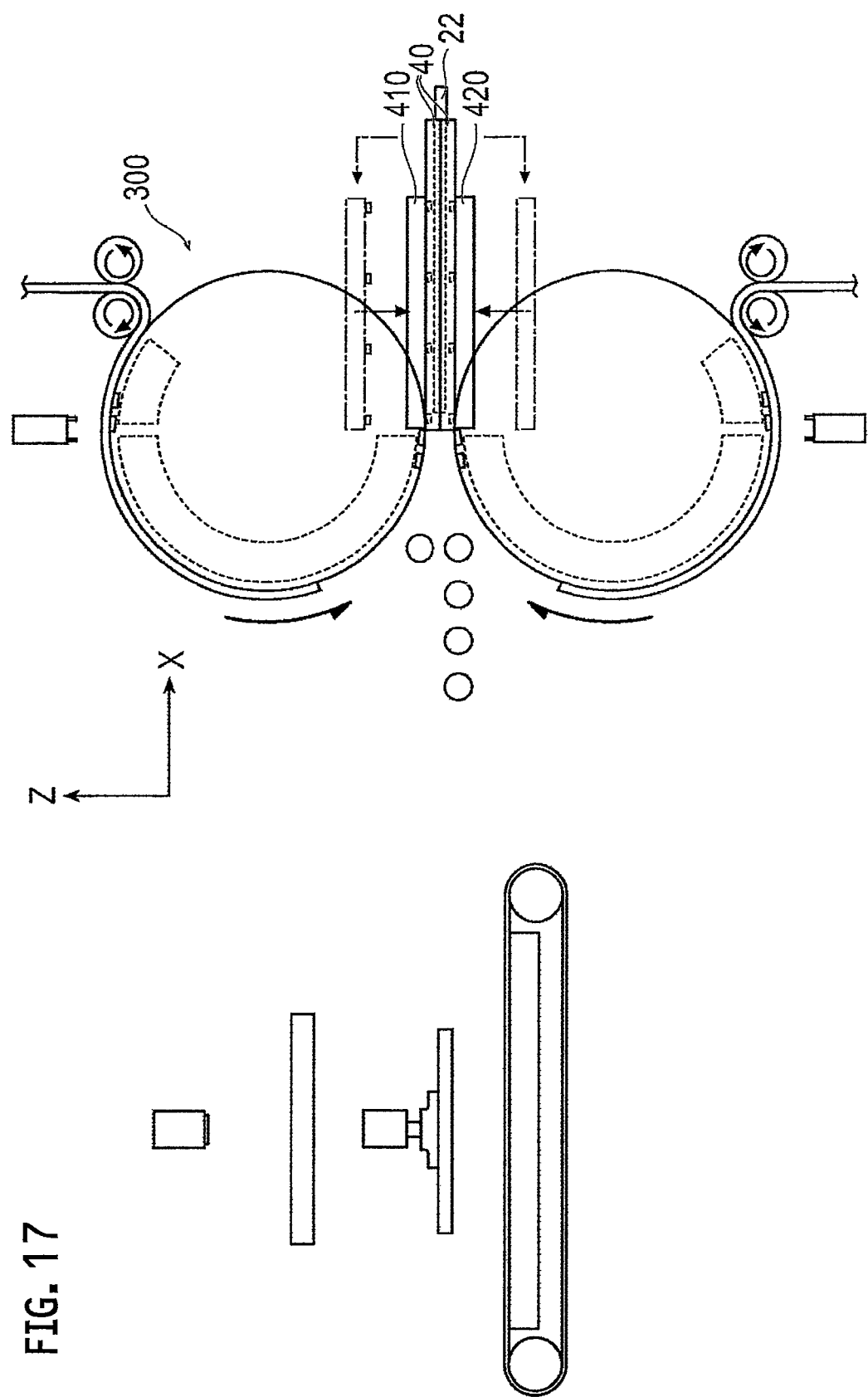
FIG. 17 is a seventh explanatory view illustrating a process of the stacking method carried out by the stacking apparatus.

After the positive electrode 22 and separators 40 laid thereon are conveyed to a predetermined position, the pair of welders 410 and 420 are separated away from each other and are moved to the upstream side of the conveying direction. As illustrated in FIG. 17, the welders 410 and 420 are again moved in the conveying direction X and toward each other to weld other joints 42. After all joints 42 are welded on each edge of the separators 40, the welders 410 and 420 are separated away from each other as illustrated in FIG. 18 to release the packaged positive electrode 20 (refer to T7 of FIG. 19). Thereafter, another welder (not illustrated) welds joints 42 along the sides 44B of the separators 40 to form the packaged positive electrode 20.

The above-mentioned processes are repeated to continuously form packaged positive electrodes 20.

The packaged positive electrodes 20 thus formed are transferred to the next stage that alternately lays the packaged positive electrodes 20 and negative electrodes 30 one on another to form the cell element 15 and finally produce the secondary cell 10.

According to the embodiment, the rotary conveyance unit (separator conveyance unit) 300 conveys the separators 40 and the electrode conveyance unit 200 conveys the positive electrode 22. The controller (synchronizer) 500 synchronizes the conveyance position and speed of the rotary conveyance unit 300 with those of the electrode conveyance unit 200 and moves the separators 40 and positive electrode 22 so that the separators 40 and positive electrode 22 overlap each other at a predetermined proper location and are conveyed at the same speed. In the synchronized state, the separators 40 are gradually stacked on the positive electrode 22 from the downstream side of the conveying direction X, portions of the separators 40 stacked on the positive electrode 22 are gradually removed from the rotary conveyance unit 300, and the remaining portions of the separators 40 are transferred onto the positive electrode 22.

Accordingly, the separators 40 are stacked on the positive electrode 22 at high speed without stoppage, to shorten a manufacturing time of cells. The conveyance position and speed of the rotary conveyance unit 300 are synchronized with those of the electrode conveyance unit 200 and the separators 40 are gradually stacked on the positive electrode 22 from the downstream side of the conveying direction X. Portions of the separators 40 laid on the positive electrode 22 are gradually removed from the rotary conveyance unit 300 and the remaining portions of the separators 40 are transferred onto the positive electrode 22. Accordingly, the separators 40 are smoothly transferred to the positive electrode 22 to prevent creases from being formed on the separators 40 and positive electrode 22 during the stacking. In the case of, for example, a large car battery, the technique of gradually stacking from a front end side (the conveying direction X side) is effective to prevent creases.

The rotary conveyance unit 300 includes the stacking drums 310 and 320 that hold and convey different separators 40 and the electrode conveyance unit 200 conveys the positive electrode 22 so that the positive electrode 22 is laid between the two separators 40 conveyed by the stacking drums 310 and 320. Accordingly, the two separators 40 are simultaneously stacked on each surface of the positive electrode 22, to speedily manufacture the packaged positive electrode 20.

The suction area A2 is formed on the outer circumferential surface 311 of each of the stacking drums (cylindrical rotors) 310 and 320 to rotate and convey the separator 40. The suction area A2 holds the drawn separator 40 until the separator 40 comes into contact with the positive electrode 22 conveyed by the electrode conveyance unit 200. This prevents creases from being formed on the separator 40 even if the stacking is carried out at high speed.

The suction area A2 releases the separator 40 that is drawn and held thereby after the separator 40 comes into contact with the positive electrode 22 conveyed by the electrode conveyance unit 200. Accordingly, no excessive force acts on the separators 40 when they are stacked on the positive electrode 22. This prevents the separators 40 from creating creases and smoothly stacks the separators 40 on the positive electrode 22.

The present invention is not limited to the above-mentioned embodiment but is modifiable in various ways within the scope of claims.

Figure 20:
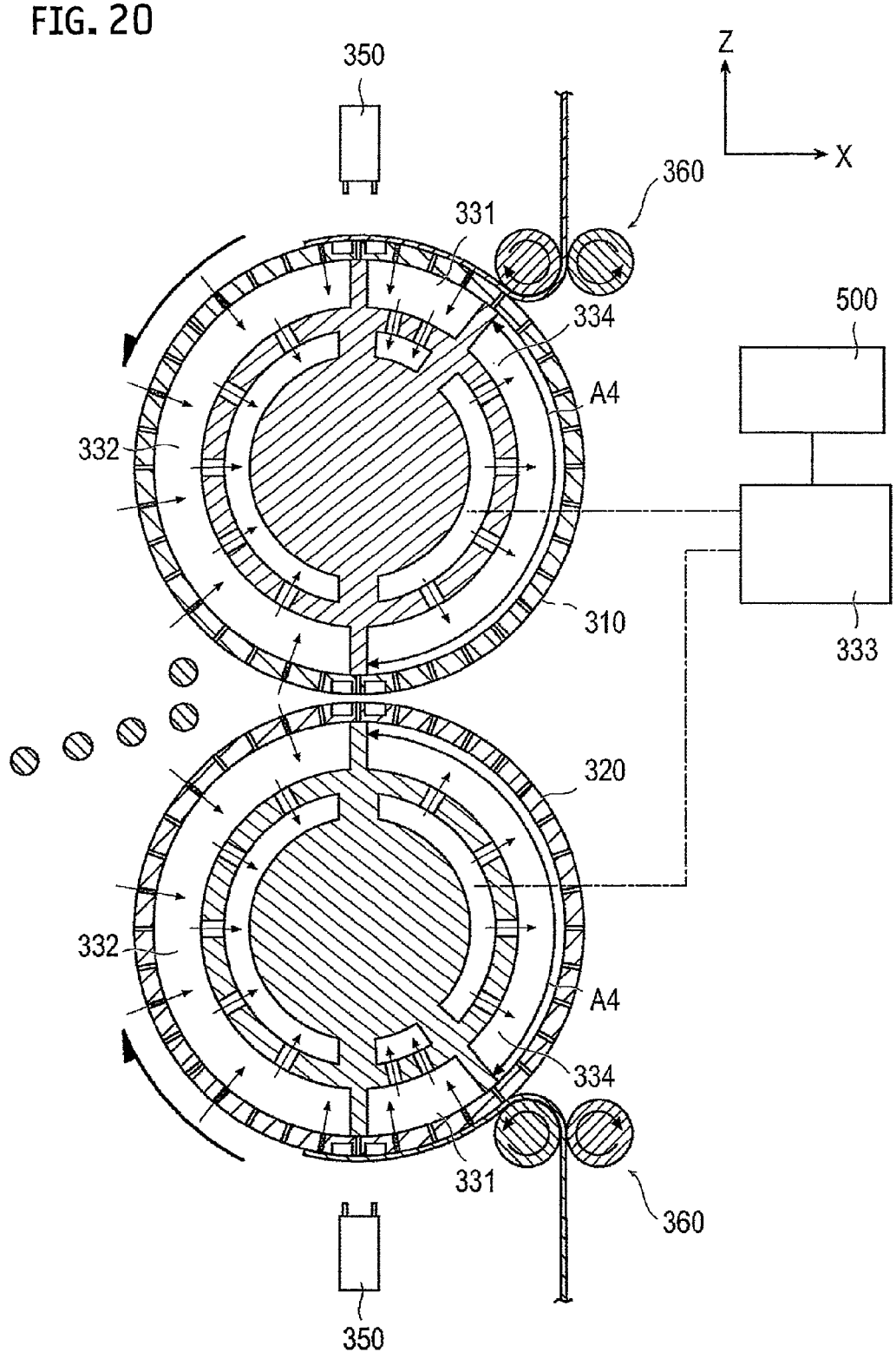
FIG. 20 is a schematic sectional view illustrating another example of the stacking apparatus.

FIG. 20 illustrates a modification of the stacking apparatus according to the embodiment. As a non-suction area A4 of each of the stacking drums 310 and 320, a pressurizing chamber 334 whose pressure is higher than an atmospheric pressure is arranged inside each of the stacking drums 310 and 320, so that a gas (fluid) is blown through the air holes 312. This configuration is capable of separating the separators 40 from the stacking drums 310 and 320 at required timing without applying large load onto the separators 40.

Figure 21:
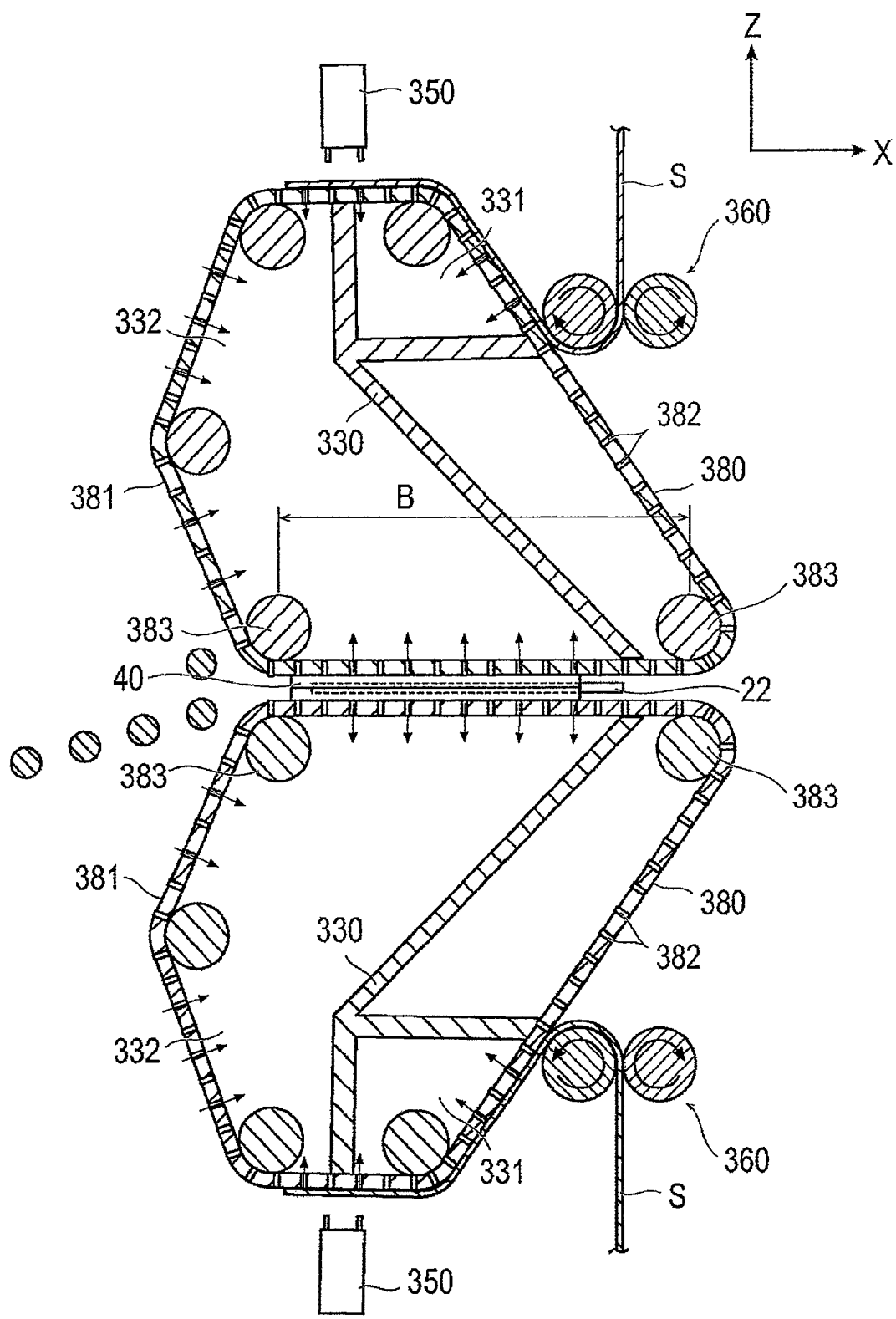
FIG. 21 is a schematic sectional view illustrating still another example of the stacking apparatus.

FIG. 21 illustrates another modification of the stacking apparatus according to the embodiment. Without using the cylindrical drums, suction belts 380 that are flexible and provided with air holes 382 are supported with a plurality of rotary rollers 383. The sectional shape of an outer circumferential surface 381 of this configuration is not limited to circular but may have an optional shape to improve the degree of freedom of design. In particular, an area B between the pair of suction belts 380 to stack separators 40 on a positive electrode 22 can be expanded so that the separators 40 and positive electrode 22 may be held between the suction belts 380 until they are welded together. This improves an accuracy of welding. In FIGS. 20 and 21, parts having the same functions as those of the embodiment are represented with like reference numerals to omit explanations thereof.

According to the embodiment, the packaged positive electrode 20 is made by packaging the positive electrode 22 in the separators 40. Instead, the above-mentioned stacking apparatus may package the negative electrode 30.

As illustrated in FIG. 1, the embodiment arranges the positive lead 11 and negative lead 12 at the same end of the jacket 13. This does not limit the present invention. For example, the positive lead 11 and negative lead 12 may be arranged at opposite ends. In this case, the power generation element 15 of the secondary cell 10 is formed by stacking the negative electrodes 30 and packaged positive electrodes 20 so that the positive tabs 23 and negative tabs 33 come alternately opposite to each other.

The embodiment prepares the predetermined gap 340 between the pair of upper and lower stacking drums 310 and 320 of the rotary conveyance unit 300. It is possible that the stacking drums 310 and 320 are in contact with each other without the gap between them. In this case, it is preferable that one or both of the stacking drums has a mechanism to follow the thicknesses of the positive electrode 22 and separators 40.

Although the electrode conveyance unit 200 conveys the positive electrode 22 in substantially a horizontal state, it may convey the positive electrode 22 in any state.

Instead of vertically arranging the pair of stacking drums 310 and 320, it is possible to arrange them in any orientation.

According to the embodiment, the separator cutter 351 cuts the single continuous separator 40 that is drawn and held by the outer circumferential surface 311 of the stacking drum 310 (320) into a predetermined shape. Instead, the separator 40 that is cut in advance into a predetermined shape may be fed to and drawn by the stacking drum.

The embodiment arranges the pair of symmetrical stacking drums 310 and 320. The pair of stacking drums (separator conveyance unit) may have asymmetrical shapes. For example, one may be a cylindrical stacking drum and the other may be a suction belt of any shape.

The stacking drums 310 and 320 each have suction force. Accordingly, only one stacking drum may sufficiently function when forming a cell element having the positive electrode 22 (or the negative electrode 30) and the separator 40 stacked on one surface of the positive electrode 22.

Although the lead-in support part 250 is entirely made of rollers, it may be made of other members such as flat members.

The cutter of the cutting part 350 may not be the thermal cutter. It may be a physically sharp cutting blade. Although the cutter receiver is the recess 313, it may not always be the recess 313.

In the slip area A1 of each of the stacking drums 310 and 320, negative pressure is adjusted to adjust slippage and suction between the separator material S and the outer circumferential surface 311. In this case, negative pressure in the first negative pressure chamber 331 may substantially be maintained constant and only the holding force of the feed roller part 360 may be used to adjust the feed and hold of the separator material S. In this case, it is preferable that the suction force of the slip area A1 is lower than that of the suction area A2.

The technique of providing the stacking drums (separator conveyance unit) 310 and 320 with drawing force is not limited to suction by negative pressure. For example, static electricity is employable to produce the drawing force.

According to the embodiment, the positive electrode cutting unit 100, image pickup camera 230, pressing part 240, conveyor 210, suction conveyance part 220, lead-in support part 250, feed roller part 360, stacking drums 310 and 320, cutting part 350, scrap suction part 370, negative pressure supply device 333, and weld unit 400 are synchronized with one another by the controller (synchronizer) 500. It is not always necessary that all of them are electrically synchronized with one another. For example, at least some of them may mechanically linked to one another for synchronization.

EFFECTS OF INVENTION

According to the stacking apparatus and stacking method of the present invention, separators and an electrode are moved so that they overlap one another at a predetermined location, the separators are transferred onto the electrode from the downstream side of the conveying direction, and the separators are gradually removed from the separator conveyance unit and are stacked on the electrode. Accordingly, the separators are speedily stacked on the electrode without stoppage, to shorten a manufacturing time of batteries.

According to the stacking apparatus and stacking method of the present invention, separators and an electrode are moved so that they overlap one another at a predetermined location, the separators are transferred onto the electrode from the downstream side of the conveying direction, and the separators are gradually removed from the separator conveyance unit and are stacked on the electrode. Accordingly, the separators are smoothly transferred onto the electrode and laid thereon, to prevent creases from being formed on the separators and electrode during the stacking.

UNITED STATES DESIGNATION

In connection with United States designation, this international patent application claims the benefit of priority under 35 U.S.C. 119(a) to Japanese Patent Application No. 2011-085733 filed on Apr. 7, 2011 whose disclosed contents are cited herein.

The invention claimed is:

1. A stacking apparatus comprising:
a separator conveyance unit configured to convey a separator of a predetermined shape in a held state to a predetermined position; and
an electrode conveyance unit configured to convey in a conveying direction an electrode of a predetermined shape to the predetermined position, wherein:
the separator conveyance unit conveys the separator and the electrode conveyance unit conveys the electrode such that the separator and the electrode overlap each other at the predetermined position;
the separator conveyance unit is configured to transfer the separator onto the electrode from a downstream side of the conveying direction such that the separator is removed from the separator conveyance unit to stack the separator on the electrode;
the separator conveyance unit includes a cylindrical rotor having a suction area on an outer circumferential surface configured to draw by suction the separator and rotate to convey the separator to the predetermined position;
the suction area is configured to maintain the suction of the separator until the separator comes into contact with the electrode conveyed by the electrode conveyance unit at the predetermined position;
the separator conveyance unit further includes a first negative pressure chamber extending along a portion of an inner circumferential surface of the cylindrical rotor;
the cylindrical rotor further includes a suction force adjusting area;
the suction force adjusting area corresponds to the first negative pressure chamber;
the separator conveyance unit further includes a second negative pressure chamber extending along a portion of the inner circumferential surface of the cylindrical rotor; and
the suction area corresponds to the second negative pressure chamber.

2. The stacking apparatus according to claim 1, further comprising:
a synchronizer configured to synchronize a conveying position and a conveyance speed of the separator conveyance unit with a conveying position and a conveyance speed of the electrode conveyance unit, wherein:
the separator conveyance unit has a first separator conveyance part and a second separator conveyance part, the first and second separator conveyance parts configured to hold and convey different separators, respectively; and
the electrode conveyance unit conveys the electrode so that the electrode is laid between the different separators conveyed by the first and second separator conveyance parts.

3. The stacking apparatus according to claim 1, wherein:
the suction area is configured to release the suction of the separator after the separator comes into contact with the electrode conveyed by the electrode conveyance unit.

4. The stacking apparatus according to claim 1, wherein:
the second negative pressure chamber is configured to produce a negative pressure at the suction area that is substantially constant; and
the first negative pressure chamber is configured to produce a negative pressure at the suction force adjusting area that is adjustable.

5. The stacking apparatus according to claim 1, wherein:
the cylindrical rotor further includes a non-suction area having no negative pressure such that the separator is not drawn by suction.

* * * * *